(12) United States Patent
Joung et al.

(10) Patent No.: US 12,206,481 B2
(45) Date of Patent: Jan. 21, 2025

(54) METHOD AND APPARATUS FOR SELECTING BEAM IN WIRELESS COMMUNICATION SYSTEM PRELIMINARY CLASS

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Seongyeop Joung, Seoul (KR); Sooyong Choi, Seoul (KR); Dongheon Lee, Seoul (KR); Chanuk Jeong, Seoul (KR)

(73) Assignees: Samsung Electronics Co., Ltd., Suwon-si (KR); Industry-Academic Cooperation Foundation, Yonsei Uni., Seoul (KR)

( * ) Notice: Subject to any disclaimer, the term of this patent is extended or adjusted under 35 U.S.C. 154(b) by 112 days.

(21) Appl. No.: 17/938,628

(22) Filed: Oct. 6, 2022

(65) Prior Publication Data
US 2023/0116056 A1 Apr. 13, 2023

(30) Foreign Application Priority Data
Oct. 6, 2021 (KR) .................. 10-2021-0132733

(51) Int. Cl.
H04B 7/06 (2006.01)
(52) U.S. Cl.
CPC ......... H04B 7/0695 (2013.01); H04B 7/0632 (2013.01)

(58) Field of Classification Search
CPC .................. H04B 7/0632; H04B 7/0695
USPC ...................................... 375/267
See application file for complete search history.

(56) References Cited

U.S. PATENT DOCUMENTS

| 11,005,556 | B2 | 5/2021 | Noh et al. | |
|---|---|---|---|---|
| 2008/0008110 | A1* | 1/2008 | Kishigami | H04W 16/28 370/310 |
| 2017/0215117 | A1* | 7/2017 | Kwon | H04B 7/0408 |
| 2021/0242928 | A1* | 8/2021 | Park | H04B 7/088 |
| 2021/0266059 | A1 | 8/2021 | Noh et al. | |

FOREIGN PATENT DOCUMENTS

KR 10-2018-0040368 A 4/2018

* cited by examiner

*Primary Examiner* — Leila Malek

(57) ABSTRACT

Provided is a communication system for supporting higher data rates. A method by which a user equipment selects a beam for transceiving data to or from a base station in an initial access mode is provided. The method includes determining a first receive-beam-parameter including information about the number of receive antennas to be used for first beam searching, receiving, from the BS, a first transmit-beam-parameter including information about the number of transmit antennas to be used for the first beam searching, receiving first RS identified based on the first transmit-beam-parameter while changing a receive beam based on the first receive-beam-parameter, selecting a transmit beam and a receive beam to be used for data transmission and reception, based on the received first RS, and transmitting information about the transmit beam to the BS.

13 Claims, 17 Drawing Sheets

METHOD AND APPARATUS FOR SELECTING BEAM IN WIRELESS COMMUNICATION SYSTEM PRELIMINARY CLASS

CROSS-REFERENCE TO RELATED APPLICATION

This application is based on and claims priority under 35 U.S.C. § 119 to Korean Patent Application No. 10-2021-0132733, filed on Oct. 6, 2021, in the Korean Intellectual Property Office, the disclosure of which is incorporated by reference herein in its entirety.

BACKGROUND

1. Field

The disclosure relates to a wireless communication system, and more particularly, to a method and apparatus for selecting a beam in a multi-input multi-output (MIMO) multi-antenna system.

2. Description of the Related Art

Looking back on a process of development of radio communication from generation to generation, technologies for human-targeted services such as voice, multimedia, data or the like have usually been developed. Connected devices that are on the explosive rise after commercialization of fifth-generation (5G) communication systems are expected to be connected to communication networks. As examples of things connected to networks, there may be cars, robots, drones, home appliances, displays, smart sensors installed in various infrastructures, construction machinery, factory equipment, etc. Mobile devices are expected to evolve to various form factors such as augmentation reality (AR) glasses, virtual reality (VR) headsets, hologram devices, and the like. In order to provide various services by connecting hundreds of billions of devices and things in the sixth-generation (6G) era, there are ongoing efforts to develop better 6G communication systems. For these reasons, 6G communication systems are referred to as beyond-5G systems.

In the 6G communication system expected to become a reality by around 2030, a maximum transfer rate is tera bits per second (bps), i.e., 1000 giga bps, and a maximum wireless delay is 100 microseconds (usec). In other words, compared to the 5G communication system, the transfer rate becomes 50 times faster and the wireless delay is reduced to a tenth (1/10) in the 6G communication system.

To attain these high data transfer rates and ultra-low delay, the 6G communication system is considered to be implemented in the terahertz (THz) band (e.g., ranging from 95 gigahertz (GHz) to 3 THz). Due to the more severe path loss and atmospheric absorption phenomenon in the THz band as compared to the millimeter wave (mmWave) band introduced in 5G systems, importance of technology for securing a signal range, i.e., coverage, is expected to grow. As major technologies for securing coverage, radio frequency (RF) elements, antennas, new waveforms superior to orthogonal frequency division multiplexing (OFDM) in terms of coverage, beamforming and massive multiple-input and multiple-output (massive MIMO), full dimensional MIMO (FFD-MIMO), array antennas, multiple antenna transmission technologies such as large scale antennas, etc., need to be developed. Besides, new technologies for increasing coverage of THz band signals, such as metamaterial based lenses and antennas, a high-dimensional spatial multiplexing technique using orbital angular momentum (OAM), reconfigurable intelligent surface (RIS), etc., are being discussed.

Furthermore, in order to enhance frequency efficiency and system networks, a full duplex technology by which both uplink and downlink transmissions use the same frequency resource at the same time, a network technology that comprehensively uses satellite and high-altitude platform stations (HAPS) and the like, a network structure innovation technology supporting mobile base stations and allowing optimization and automation of network operation, a dynamic spectrum sharing technology through collision avoidance based on spectrum usage prediction, an artificial intelligence (AI) based communication technology to realize system optimization by using AI from the designing stage and internalizing an end-to-end AI supporting function, a next generation distributed computing technology to realize services having complexity beyond the limit of terminal computing capability by using ultrahigh performance communication and computing resources (e.g., mobile edge computing (MEC) cloud) are being developed in the 6G communication system. In addition, by designing new protocols to be used in 6G communication systems, developing mechanisms for implementing a hardware-based security environment and safe use of data, and developing technologies for protecting privacy, attempts to strengthen connectivity between devices, further optimize the network, promote softwarization of network entities, and increase the openness of wireless communication are continuing.

With such research and development of the 6G communication system, it is expected that new levels of the next hyper-connected experience become possible through hyper-connectivity of the 6G communication system including not only connections between things but also connections between humans and things. Specifically, it is predicted that services such as truly immersive extended reality (truly immersive XR), high-fidelity mobile hologram, digital replica, etc., may be provided. Furthermore, services such as remote surgery, industrial automation and emergency response with enhanced security and reliability may be provided through the 6G communication system to be applied in various areas such as industry, medical care, vehicles, appliances, etc.

SUMMARY

An embodiment of the disclosure may provide a technology to reduce the number of times of beam searching and overhead caused by the beam searching in a wireless communication system through wide beams using a small number of antennas.

An embodiment of the disclosure may provide a technology to perform hierarchical beam searching or select a beam for data transmission or reception by an artificial intelligence (AI) algorithm in a wireless communication system, thereby reducing overhead caused by the beam searching and deterioration in overall communication performance.

Additional aspects will be set forth in part in the description which follows and, in part, will be apparent from the description, or may be learned by practice of the presented embodiments of the disclosure.

According to an embodiment of the disclosure, a method, performed by a user equipment (UE), of selecting a beam for transmitting or receiving data to or from a base station (BS) in an initial access mode of a wireless communication system includes determining a first receive beam parameter including information about a number of receive antennas to be used for first beam searching, receiving, from the BS, a first transmit beam parameter including information about a number of transmit antennas to be used for the first beam searching, receiving first reference signal (RS) identified based on the first transmit beam parameter while changing a receive beam based on the first receive beam parameter, selecting a transmit beam and a receive beam to be used for data transmission and reception, based on the received first RS, and transmitting information about the selected transmit beam to the BS.

According to an embodiment of the disclosure, a method, performed by a BS, of selecting a beam for transmitting or receiving data to or from a UE in an initial access mode of a wireless communication system includes determining a first transmit beam parameter including information about a number of transmit antennas to be used for first beam searching, transmitting the determined first transmit beam parameter to the UE, transmitting first reference signal to the UE while changing a transmit beam based on the first transmit beam parameter, receiving, from the UE, information about a transmit beam to be used for data transmission, and selecting a beam for data transmission or reception with the UE, based on the received information about the transmit beam.

According to an embodiment of the disclosure, a method, performed by a receiver (RX), of performing data transmission or reception with a transmitter (TX) in a beam recovery mode of a wireless communication system includes identifying a first receive beam parameter including information about a number of receive antennas to be used for first beam searching and first transmit beam parameter including information about the number of transmit antennas to be used for the first beam searching, receiving first RS identified based on the first transmit beam parameter while changing a receive beam based on the first receive beam parameter, selecting a transmit beam and a receive beam to be used for data transmission and reception, based on the received first RS, and transmitting information about the selected transmit beam to the transmitter.

According to an embodiment of the disclosure, a UE for selecting a beam for data transmission or reception with a BS in a wireless communication system includes a transceiver and at least one processor. The at least one processor may be configured to determine a first receive beam parameter including information about a number of receive antennas to be used for first beam searching, receive, from the BS through the transceiver, a first transmit beam parameter including information about a number of transmit antennas to be used for the first beam searching, receive first RS identified based on the first transmit beam parameter while changing a receive beam based on the first receive beam parameter, select a transmit beam and a receive beam to be used for data transmission and reception, based on the received first RS, and transmit information about the selected transmit beam to the transmitter through the transceiver.

According to an embodiment of the disclosure, a BS for selecting a beam for data transmission or reception with a UE in a wireless communication system includes a transceiver and at least one processor. The at least one processor may be configured to determine a first transmit beam parameter including information about a number of transmit antennas to be used for first beam searching, transmit the determined first beam parameter to the UE through the transceiver, transmit first RS to the UE while changing a transmit beam based on the first transmit beam parameter, receive, from the UE through the transceiver, information about a transmit beam to be used for data transmission, and select a beam for data transmission or reception with the UE, based on the received information about the transmit beam.

According to an embodiment of the disclosure, provided is a computer-readable recording medium storing a program for executing, on a computer, a method in at least one of the embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
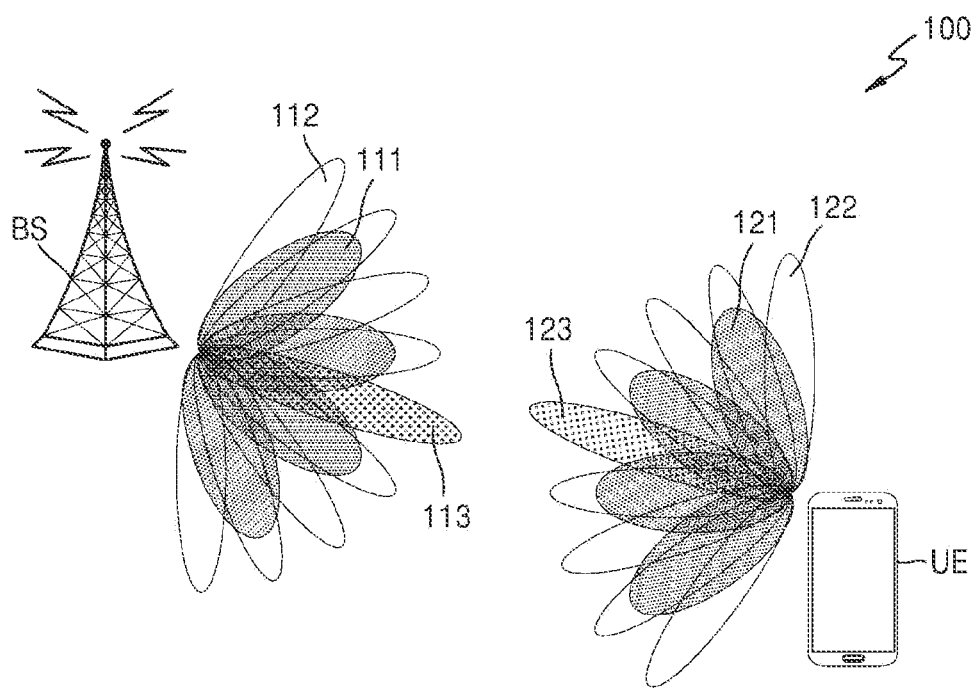
FIG. 1 illustrates a method of selecting a beam in a wireless communication system according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will now be described in detail with reference to accompanying drawings.

Description of technological content well-known in the art or not directly related to the disclosure will be omitted herein. Through the omission of the content that might otherwise obscure the subject matter of the disclosure, the subject matter will be understood more clearly. Further, the terms, as will be mentioned later, are defined by taking functionalities in the disclosure into account, but may vary depending on practices or intentions of users or operators. Accordingly, the terms should be defined based on descriptions throughout this specification.

For the same reason, some parts in the accompanying drawings are exaggerated, omitted or schematically illustrated. The size of the respective elements may not fully reflect their actual size. Like numbers refer to like elements throughout the drawings.

Throughout the disclosure, the expression "at least one of a, b or c" indicates only a, only b, only c, both a and b, both a and c, both b and c, all of a, b, and c, or variations thereof.

Throughout the specification, a layer may also be referred to as an entity.

Advantages and features of the disclosure, and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. Like numbers refer to like elements throughout the specification. In the description of the disclosure, when it is determined that a detailed description of related functions or configurations may unnecessarily obscure the subject matter of the disclosure, the detailed description will be omitted. Further, the terms, as will be mentioned later, are defined by taking functionalities in the disclosure into account, but may vary depending on practices or intentions of users or operators. Accordingly, the terms should be defined based on descriptions throughout this specification.

A base station (BS) as herein used may refer to an entity for performing resource allocation for a user equipment (UE) and may be at least one of gNode B, eNode B, Node B (or xNode B, where x represents any letter including "g" and "e"), a radio access unit, a BS controller, a satellite, an airborne vehicle or a node in a network. A UE may include a mobile station (MS), a vehicle, a satellite, an airborne vehicle, a cellular phone, a smart phone, a computer, or a multimedia system having a communication function. In the disclosure, a downlink (DL) may refer to a radio transmission path for a signal transmitted from a BS to a UE, and an uplink (UL) may refer to a radio transmission path for a signal transmitted from a UE to a BS. In addition, there may be a sidelink (SL) that refers to a radio transmission path for a signal transmitted from a UE to another UE.

Although the following embodiments of the disclosure will be focused on the long term evolution (LTE), LTE-Advanced (LTE-A) or a fifth generation (5G) system as an example, they may be applied to other communication systems with similar technical backgrounds or channel types. For example, the other communication systems may include a 5G-Advanced, new radio (NR)-Advanced or sixth generation (6G) mobile communication technology developed after the 5G mobile communication technology (or NR), and the term 5G may be a concept including the existing LTE, LTE-A and other similar services. Furthermore, embodiments of the disclosure will also be applied to different communication systems with some modifications to such an extent that does not significantly deviate the scope of the disclosure when judged by skilled people in the art.

It will be understood that each block and combination of the blocks of a flowchart may be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide steps for performing functions described in the block(s) of the flowchart.

Furthermore, each block may represent a part of a module, segment, or code including one or more executable instructions to perform particular logic function(s). It is noted that the functions described in the blocks may occur out of order in some alternative embodiments. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and modules may be combined into a smaller number of components and modules, or further divided into a larger number of components and modules. Moreover, the components and modules may be implemented to execute one or more central processing units (CPUs) in a device or security multimedia card. In embodiments of the disclosure, the module may include one or more processors.

In the following description, the terms referring to broadcast information, control information, state changes (e.g., events), network entities, messages, and components of an apparatus, the terms related to communication coverage, etc., are mentioned for convenience of explanation. The disclosure is not limited to the terms as will be used in the following description, and may use different terms having the same meaning in a technological sense.

In the following description, for convenience of explanation, terms and definitions used in the most recent standards among the currently existing communication standards, i.e., in the LTE and NR standard defined in the 3rd generation partnership project (3GPP) will be used in the disclosure. The disclosure is not, however, limited to the terms and definitions, and may be equally applied to any systems that conform to other standards.

FIG. 1 illustrates a method of selecting a beam in a wireless communication system 100 according to various embodiments of the present disclosure.

Referring to FIG. 1, the wireless communication system 100 may include at least one BS and at least one UE. In an embodiment of the disclosure, the wireless communication system 100 may include a multi-input multi-output (MIMO) antenna system. In the wireless communication system 100, for data transmission or reception between a BS and a UE, a beam for data transmission or reception may be selected for each network entity. A beam selection operation may include a beam searching (or beam sweeping or beam learning) operation. The beam searching operation may refer to an operation of a BS or a UE transmitting or receiving a reference signal (RS) while changing analog beams. Information about various analog beams may be obtained by the RS transmission or reception operation, and a suitable beam may be selected for data communication.

For example, in a case of UL, the UE may repeatedly transmit an RS while changing transmit beams and the BS may receive the RS while changing receive beams. The BS may then use at least one of a received signal strength indicator (RSSI), reference signal received quality (RSRQ), or reference signal received power (RSRP) through the received RS to determine a transmit beam and a receive beam for data communication. After this, the BS may transmit information about the determined transmit beam to the UE, which may in turn use the transmit beam identified through the information transmitted from the BS to transmit data to the BS. The BS may use the determined receive beam to receive the data from the UE.

In a case of DL, the BS may repeatedly transmit an RS while changing transmit beams and the UE may receive the RS while changing receive beams. The UE may then use at least one of an RSSI, RSRQ, or RSRP through the received RS to determine a transmit beam and a receive beam for data communication. After this, the UE may transmit information about the determined transmit beam to the BS, which may in turn use the transmit beam identified through the information transmitted from the UE to transmit data to the UE. The UE may use the determined receive beam to receive the data from the BS.

In performing the beam searching operation, as the number of candidate beams increases, the number of times of sending the RS increases and accordingly, system overhead increases. The wireless communication system 100 that uses a plurality of antennas requires more sophisticated beam searching, so beam searching needs to be done for a large number of candidate beams. Hence, in the wireless communication system 100 that uses the plurality of antennas, beam searching accounts for a large portion of overhead.

Referring to FIG. 1, a method of selecting a beam in a wireless communication system 100 includes performing a small number of times of first beam searching with a wide first beam 111 or 121 and determining a beam 113 or 123 to be used for data transmission or reception based on information obtained by the first beam searching. In an embodiment of the disclosure, the method of selecting the beam 113 or 123 to be used for data transmission or reception may further include a second beam searching operation performed with a second beam 112 or 122 after the first beam searching operation with the first beam 111 or 121. Beam width of the second beam 112 or 122 may be narrower than the beam width of the first beam 111 or 121.

In an embodiment of the disclosure, the beam selection method may be applied in an initial access mode and a beam recovery mode.

In the initial access mode, a network entity such as the BS or the UE may determine the beam 113 or 123 to be used for data transmission or reception by performing first beam searching with the relatively wide first beam 111 or 121 and performing second beam searching with the second beam 112 or 122 relatively narrower than the first beam 111 or 121 according to an RSRP value or applying an artificial intelligence (AI) algorithm, e.g., a deep neural network (DNN) algorithm, to at least one of the first beams 111 and 121.

In the beam recovery mode, a network entity such as the BS or the UE may determine the beam 113 or 123 for beam recovery by determining a beam parameter of the first beam 111 or 121 to be used for a first beam searching operation, performing the first beam searching based on the beam parameter, and performing second beam searching with the second beam 112 or 122 relatively narrower than the first beam 111 or 121 or applying an AI algorithm, e.g., a DNN algorithm, to at least one of the first beams 111 and 121.

Figure 2:
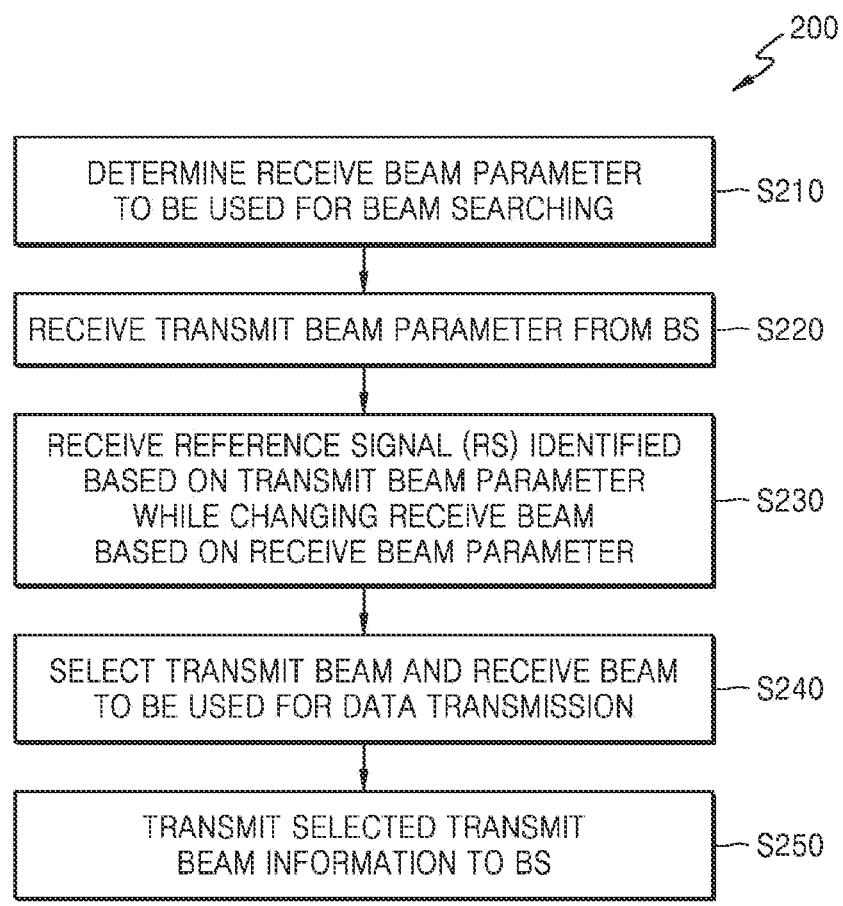
FIG. 2 illustrates a flowchart of a method by which a user equipment (UE) selects a beam in an initial access mode according to various embodiments of the present disclosure.

FIG. 2 illustrates a flowchart of a method 200 by which a UE selects a beam in an initial access mode according to various embodiments of the present disclosure.

In the embodiment of the disclosure of FIG. 2, the initial access mode in which the UE accesses the BS for the first time and receives data from the BS may be considered. Although a DL operation of the UE receiving data from the BS is described in FIG. 2, a beam selection method according to an embodiment of the disclosure is not limited to the embodiment of FIG. 2, and may be similarly applied to a UL operation of the BS receiving data from the UE.

In operation S210, the UE determines a receive beam parameter to be used for beam searching. The receive beam parameter may include the number of receive antennas used for data reception or the number of candidate receive beams available for data reception. A receive beam may be identified based on the receive beam parameter. For example, as the receive beam parameter, the number of receive antennas may be related to the width of a receive beam and the number of candidate receive beams may be related to the number of times of beam searching. In an embodiment of the disclosure, the receive beam parameter may be set in advance or determined based on e.g., remaining energy of the UE and required maximum transmission latency.

In operation S220, the UE receives a transmit beam parameter from the BS. The transmit beam parameter may include the number of transmit antennas used for data transmission or the number of candidate transmit beams available for data transmission. A transmit beam may be identified based on the transmit beam parameter. For example, as the transmit beam parameter, the number of transmit antennas may be related to the width of a transmit beam and the number of candidate transmit beams may be related to the number of times of beam searching. In an embodiment of the disclosure, the transmit beam parameter may be set in advance.

In operation S230, the UE receives an RS identified based on the transmit beam parameter while changing receive beams based on the receive beam parameter. For example, the UE may define a receive beam based on the receive beam parameter, and the BS may define a transmit beam based on the transmit beam parameter. After this, the UE may receive an RS from the BS while changing the receive beam. The BS may also change the transmit beam when transmitting the RS to the UE.

In operation S240, the UE selects a transmit beam and a receive beam to be used for data transmission. In an embodiment of the disclosure, the transmit beam and the receive beam to be used for data transmission may be determined based on an RSRP value. In an embodiment of the disclosure, when the RSRP value is larger than a certain value, a signal to noise ratio (SNR) higher than a certain level may be secured. When the RSRP value for all transmit and receive beams is less than a threshold, the UE and the BS may perform an additional beam searching operation. The width of a transmit beam used for the additional beam searching operation may be smaller than the width of a transmit beam used for the previous beam searching operation, and the width of a receive beam used for the additional beam searching operation may be smaller than the width of a receive beam used for the previous beam searching operation. The additional beam searching operation performed by the UE and the BS will be described in more detail later in connection with FIG. 5.

When the RSRP value for at least one transmit or receive beam is equal to or larger than the threshold, the UE may determine a transmit beam and a receive beam to be used for data transmission through an AI algorithm. The AI algorithm may include, for example, a DNN algorithm. The operation of the UE determining final transmit and receive beams to be used for data transmission through the AI algorithm will be described in more detail later in connection with FIGS. 6 and 7.

In operation S250, the UE transmits information about the selected transmit beam to the BS.

After this, the UE and the BS may transmit or receive data with the selected transmit beam and the receive beam. Specifically, the UE may receive data with the selected receive beam, and the BS may identify the transmit beam based on the transmit beam information received from the UE and transmit data with the identified transmit beam.

Figure 3A:
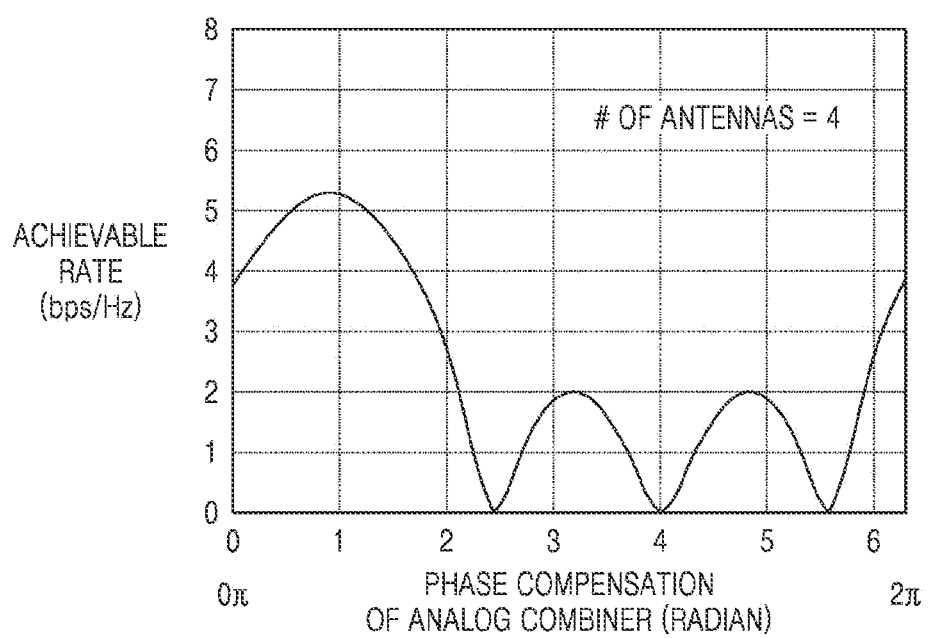
FIG. 3A illustrates an operation of determining a beam parameter to be used for beam searching according to various embodiments of the present disclosure.
Figure 3B:
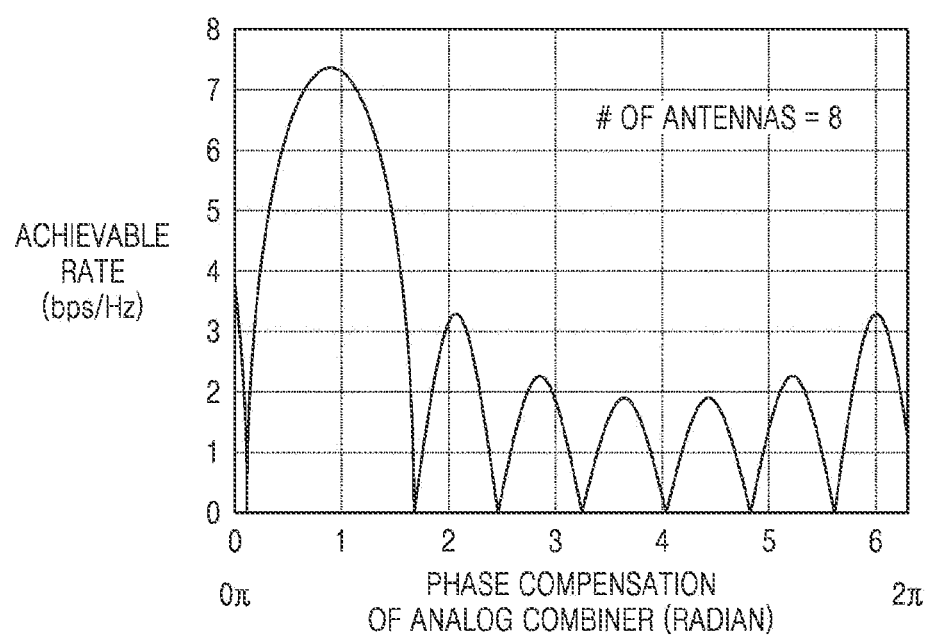
FIG. 3B illustrates an operation of determining a beam parameter to be used for beam searching according to various embodiments of the present disclosure.

FIGS. 3A and 3B are diagrams for describing an operation of determining beam parameters to be used for beam searching, according to an embodiment of the disclosure.

The beam parameters include a transmit beam parameter for identifying a transmit beam and a receive beam parameter for identifying a receive beam. The beam parameter may include the number of transmit or receive antennas activated among multiple antennas or the number of candidate transmit or receive beams available for data transmission or reception.

The number of antennas activated in the multiple antenna system may be related to beam width. FIG. 3A shows an occasion when there are 4 antennas, and FIG. 3B shows an occasion when there are 8 antennas. Referring to FIGS. 3A and 3B, the less the number of antennas, the wider the width of a beam may be formed.

Turning back to FIG. 1, the first beam 111 or 121 may be wider than the second beam 112 or 122. In this case, the number of antennas used to identify the first beam 111 or 121 may be smaller than the number of antennas used to identify the second beam 112 or 122. For example, the first beam 111 or 121 having relatively wide width may be used for a first beam searching operation, and the second beam 112 or 122 having relatively narrower width than the first beam 111 or 121 may be used for a second beam searching operation subsequent to the first beam searching operation. Although it is shown in FIG. 1 that the first beam 111 on the BS side and the first beam 121 on the UE side have the same width and the second beam 112 on the BS side and the second beam 122 on the UE side have the same width, the first beam 111 on the BS side and the first beam 121 on the UE side may be different and the second beam 112 on the BS side and the second beam 122 on the UE side may be different.

The number of candidate transmit or receive beams to be used for data transmission or reception may be related to the number of times of beam searching. Turning back to FIG. 1, the number of candidate transmit or receive beams as another beam parameter to identify the first beam 111 or 121 may be four and the number of candidate transmit or receive beams to identify the second beam 112 or 122 may be nine, without being limited thereto.

In an embodiment of the disclosure, the number of candidate beams may be determined regardless of the beam width, i.e., the number of antennas used. For example, the number of candidate transmit or receive beams to identify the first beam 111 or 121 having large width may be nine. In this case, an overlapped spatial area searched for in a beam searching process with the first beam 111 or 121 may grow, and the whole power consumption of the system may increase. In another example, the number of candidate transmit or receive beams to identify the second beam 112 or 122 having small width may be four. In this case, the spatial area that is not searched for in the beam searching process with the second beam 112 or 122 may grow, and accuracy in optimal beam selection for data transmission or reception may be reduced.

In an embodiment of the disclosure, an operation of determining a beam parameter to be used for beam searching operation may include determining the number of transmit or receive antennas activated among multiple antennas such that a beam identified based on the determined beam parameter is wider than a final beam to be used for data transmission or reception. Furthermore, the operation of determining the beam parameter may include determining the number of candidate transmit or receive beams such that a smaller number of times of beam searching is performed by minimizing the spatial area in which a beam identified based on the determined beam parameter is overlappingly searched for.

In an embodiment of the disclosure, $N_T$ may denote the number of transmit antennas to be used for data communication, $N_R$ may denote the number of receive antennas to be used for data communication, M may denote the number of candidate transmit beams to be used for data transmission, and N may denote the number of candidate receive beams to be used for data communication. $N_T$ and $N_R$ may denote codeword dimensions. Furthermore, as the beam parameter, $N_t$ may denote the number of transmit antennas used for beam searching, $N_r$ may denote the number of receive antennas used for beam searching, $M_{partial}$ may denote the number of candidate transmit beams used for beam searching, and $N_{partial}$ may denote the number of candidate receive beams used for beam searching.

In an embodiment of the disclosure, a channel between a transmitter TX and a receiver RX may be denoted by H $[N_T \times N_R]$, a candidate transmit beam to be used for data communication may be denoted by $f_m$, m=1, ..., M, and a candidate receive beam to be used for data communication may be denoted by $w_n$, n=1, ..., N. $w_n[1 \times N_R] \in \{w_1, w_2, ..., w_N\}$ may denote an analog combiner, and $f_m$ $[N_T \times 1] \in \{f_1, f_2, ..., f_M\}$ may denote an analog precoder. Furthermore, a channel used for beam searching may be denoted by $H^{wid}$, a transmit beam used for beam searching may be denoted by $f^{wide}_m$, m=1, ..., $M_{partial}$, and a receive beam used for beam searching may be denoted by $w^{wide}_n$, n=1, ..., $N_{partial}$. $H^{wide}$ may represent a channel H reconfigured between the transmitter TX and the receiver RX by adjusting the number of antennas. In an embodiment of the disclosure, $N_{partial} < N$, $M_{partial} < M$, $N_r < N_R$, $N_t < N_T$ may be satisfied.

In an embodiment of the disclosure, the beam parameter may be set in advance, or may be determined based on UE information such as remaining energy, required maximum transmission latency, etc., or channel state information such as a channel quality indicator (CQI). For example, the beam parameter may be determined based on the remaining energy of the UE, the required maximum transmission latency, and the CQI value. An embodiment in which the beam parameter is determined based on the remaining energy of the UE, the required maximum transmission latency, and the CQI value will be described in more detail later in connection with FIG. 10.

Figure 4:
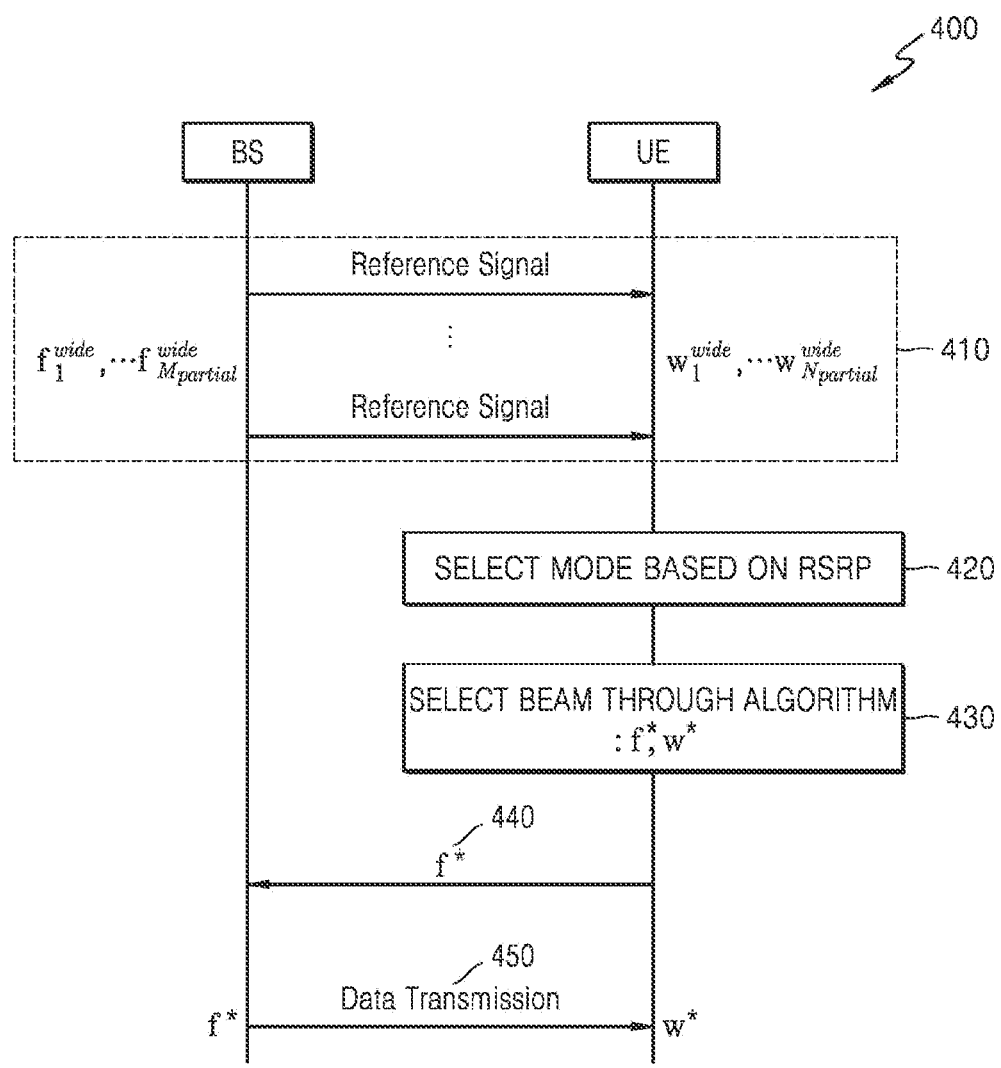
FIG. 4 illustrates operations between a UE and a base station (BS) for performing a method of selecting a beam according to various embodiments of the present disclosure.

FIG. 4 illustrates operations between a BS and a UE for performing a method 400 of selecting beams f* and w* according to various embodiments of the present disclosure.

In operation 410, the UE receives an RS transmitted through a transmit beam $f^{wide}_m$, m=1, ..., $M_{partial}$ identified based on transmit beam parameters $N_t$ and $M_{partial}$ while changing a receive beam $w^{wide}_n$, n=1, ..., $N_{partial}$ based on receive beam parameters $N_r$ and $N_{partial}$.

The UE may determine the receive beam parameters $N_r$ and $N_{partial}$ to be used for beam searching. The receive beam parameter may include the number $N_r$ of receive antennas used for data reception or the number $N_{partial}$ of candidate receive beams available for data reception. The receive beam $w^{wide}_n$ may be identified based on the receive beam parameter $N_r$ and $N_{partial}$. For example, as the receive beam parameter, the number $N_r$ of receive antennas may be related to the width of the receive beam $w^{wide}_n$, and the number $N_{partial}$ of candidate receive beams may be related to the number of times of beam searching. In an embodiment of the disclosure, the receive beam parameters $N_r$ and $N_{partial}$ may be set in advance or determined based on e.g., remaining energy of the UE and required maximum transmission latency. For example, the receive beam parameters $N_r$ and $N_{partial}$ may be determined to be $$N_r = \frac{N_R}{2} \text{ and } N_{partial} = \frac{N}{2}$$

when a total number of receive antennas is $N_R$ and a total number of candidate receive beams available for data communication is N. In an embodiment of the disclosure, $N_r$ may be determined to be an integer $N_R \times \alpha$ where $0 < \alpha \leq 1$, and $N_{partial}$ may be determined to be an integer $N \times \beta$ where $0 < \beta \leq 1$.

The UE may receive the transmit beam parameters $N_t$ and $M_{partial}$ from the BS. The transmit beam parameter may include the number $N_t$ of transmit antennas used for data transmission or the number $M_{partial}$ of candidate transmit beams available for data transmission. The transmit beam $f^{wide}_m$ may be identified based on the transmit beam parameter Ni and $M_{partial}$. For example, as the transmit beam parameter, the number $N_t$ of transmit antennas may be related to the width of the transmit beam $f^{wide}_m$, and the number $M_{partial}$ of candidate transmit beams may be related to the number of times of beam searching. In an embodiment of the disclosure, the transmit beam parameters $N_t$ and $M_{partial}$ may be set in advance. For example, the transmit beam parameters $N_t$ and $M_{partial}$ may be determined to be $$N_t = \frac{N_T}{2} \text{ and } M_{partial} = \frac{M}{2}$$

when a total number of transmit antennas is $N_T$ and a total number of candidate transmit beams available for data communication is M. In an embodiment of the disclosure, $N_t$ may be determined to be an integer $N_T \times \gamma$ where $0 < \gamma \leq 1$, and $M_{partial}$ may be determined to be an integer $M \times \delta$ where $0 < \delta \leq 1$.

For example, the UE may identify the receive beam $w^{wide}_n$ based on the receive beam parameter $N_r$ and $N_{partial}$, and the BS may identify the transmit beam $f^{wide}_m$ based on the transmit beam parameter $N_t$ and $M_{partial}$ received from the UE. After this, the UE may receive an RS from the BS while changing the receive beam $w^{wide}_n$. The BS may also change the transmit beam $f^{wide}_m$ when transmitting the RS to the UE.

In operation 420, the UE may determine a mode to select a transmit beam and a receive beam to be used for data transmission based on RSRP. The mode to select the transmit beam and the receive beam may include a first mode and a second mode. The UE may identify a beam having the largest RSRP value among the beams used in the beam searching process of operation 410. The UE may determine a beam selection mode as the first mode when the RSRP value of the identified beam is less than a preset threshold, and determine a beam selection mode as the second mode when the RSRP value of the identified beam is equal to or greater than the preset threshold. When the beam selection mode is the first mode, the method 400 may proceed to an operation of changing the beam parameter to perform second beam searching. When the beam selection mode is the second mode, the method 400 may proceed to operation 430. An embodiment in which the beam selection mode is determined to be the first mode so that the UE and the BS perform an additional beam searching operation (second beam searching) will be described in more detail later in connection with FIG. 5.

In operation 430, when the beam selection mode is determined to be the second mode, the UE may select the transmit beam f* and the receive beam w* to be used for data transmission based on an AI algorithm. The UE may select the transmit beam f* and the receive beam w* to be used for data transmission by applying the AI algorithm to beams $f^{wide}_k$ and $w^{wide}_l$ identified to have the largest RSRP value among the beams used in the beam searching process of operation 410. The AI algorithm may include, for example, a DNN algorithm. The operation of the UE determining final transmit and receive beams to be used for data transmission through the AI algorithm will be described in more detail later in connection with FIGS. 6 and 7.

In operation 440, the UE transmits information about the selected transmit beam f* to the BS. The receive beam w* is a beam used by the UE to receive data from the BS, so the information about the receive beam w* may not be transmitted to the BS.

After this, in operation 450, the UE and the BS may transmit or receive data with the selected transmit beam f* and the receive beam w*. Specifically, the UE may receive data with the selected receive beam w*, and the BS may identify the transmit beam f* based on information about the transmit beam f* received from the UE and transmit data with the identified transmit beam f*.

Figure 5:
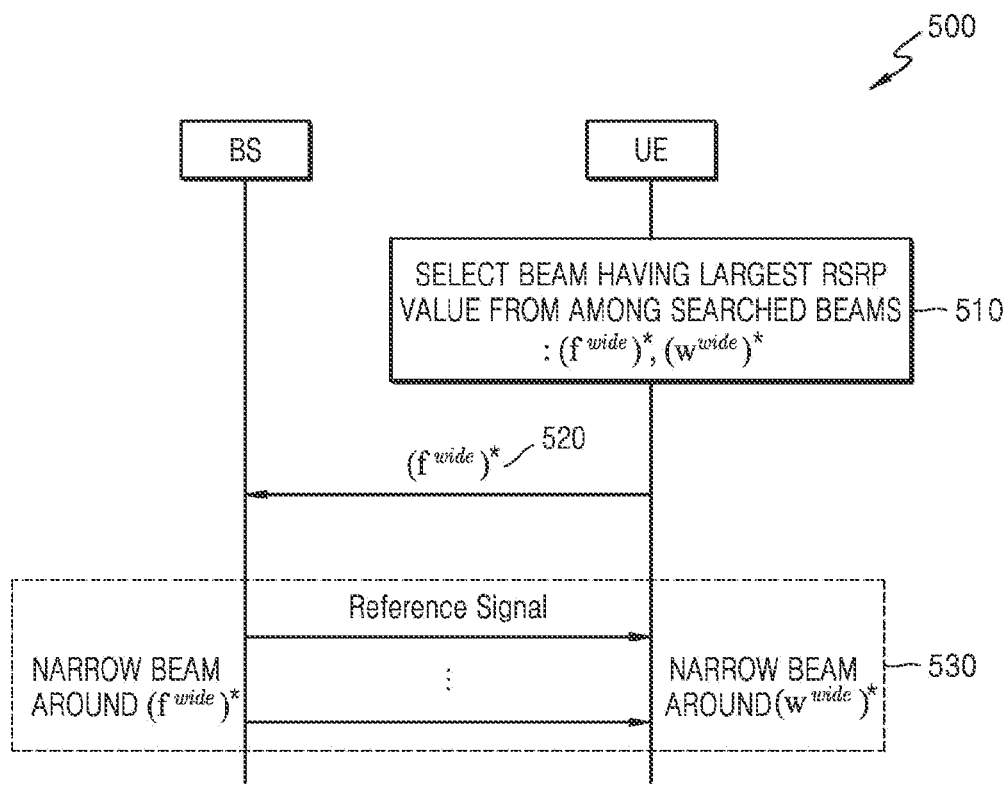
FIG. 5 illustrates a sequence diagram for describing a narrow-beam based second beam searching operation optionally performed after a wide-beam based first beam searching operation in a method of selecting a beam according to various embodiments of the present disclosure.

FIG. 5 illustrates a sequence diagram for describing a narrow-beam based second beam searching operation 500 optionally performed after a wide-beam based first beam searching operation in a method of selecting a beam according to various embodiments of the present disclosure.

Turning back to FIG. 4, the UE receives an RS transmitted through a transmit beam $f^{wide}_m$, $m=1, \ldots, M_{partial}$ identified based on the transmit beam parameter $N_t$ and $M_{partial}$ while changing the receive beam $w^{wide}_n$, $n=1, \ldots, N_{partial}$ based on the receive beam parameter $N_r$ and $N_{partial}$.

The operation of performing beam searching with the receive beam identified based on the receive beam parameter $N_r$ and $N_{partial}$ and the transmit beam identified based on the transmit beam parameter $N_t$ and $M_{partial}$ may be referred to as a first beam searching operation for convenience.

In an embodiment of the disclosure, an RSRP value for any transmit beam or receive beam obtained in the first beam searching operation may be smaller than a threshold. In this case, it may be understood that in the first beam searching operation, a candidate beam suitable for data transmission or reception has not been discovered. The UE and the BS may thus perform an additional beam searching operation by changing the beam parameter. The beam searching operation additionally performed may be referred to as a second beam searching operation for convenience.

A second receive beam parameter used in the second beam searching operation may include the number $N_r'$ of receive antennas used for data reception or the number $N_{partial}'$ of candidate receive beams available for data reception. The second receive beam $w^{wide}_n{}'$ may be identified based on the second receive beam parameter $N_r'$ and $N_{partial}'$. For example, as the second receive beam parameter, the number $N_r'$ of receive antennas may be related to the width of the second receive beam $w^{wide}_n{}'$, and the number $N_{partial}'$ of candidate receive beams may be related to the number of times of beam searching in the second beam searching operation. In an embodiment of the disclosure, the second receive beam parameter $N_r'$ and $N_{partial}'$ may be set in advance.

For example, when a total number of receive antennas available for data communication is $N_R$ and a total number of candidate receive beams available for data communication is N, $N_r'$ may be determined to be an integer $N_R \times \alpha'$ where $0 < \alpha' \le 1$ and $N_{partial}'$ may be determined to be an integer $N \times \beta'$ where $0 < \beta' \le 1$. In an embodiment of the disclosure, as the second receive beam parameter, the number $N_r'$ of receive antennas is a first receive beam parameter, which may be larger than the number $N_r$ of receive antennas. In other words, it may satisfy a condition of $0 < \alpha < \alpha' \le 1$. In this case, the width of the first receive beam for the first beam searching may be larger than the width of the second receive beam for the second beam searching.

A second transmit beam parameter used in the second beam searching operation may include the number $N_t'$ of transmit antennas used for data transmission or the number $M_{partial}'$ of candidate transmit beams available for data transmission. The second transmit beam $f^{wide}_n{}'$ may be identified based on the second transmit beam parameter $N_t'$ and $M_{partial}'$. For example, as the second transmit beam parameter, the number $N_t'$ of transmit antennas may be related to the width of the second transmit beam $f^{wide}_n{}'$, and the number $M_{partial}'$ of candidate transmit beams may be related to the number of times of beam searching in the second beam searching operation. In an embodiment of the disclosure, the second transmit beam parameter $N_t'$ and $M_{partial}'$ may be set in advance.

For example, when a total number of transmit antennas available for data communication is $N_T$ and a total number of candidate transmit beams available for data communication is M, $N_t'$ may be determined to be an integer $N_T \times \gamma'$ where $0 < \gamma' \le 1$ and $M_{partial}'$ may be determined to be an integer $M \times \delta'$ where $0 < \delta' \le 1$. In an embodiment of the disclosure, as the second transmit beam parameter, the number $N_t'$ of transmit antennas is a first transmit beam parameter, which may be larger than the number $N_t$ of transmit antennas. In other words, it may satisfy a condition of $0 < \gamma < \gamma' \le 1$. In this case, the width of the first transmit beam for the first beam searching may be larger than the width of the second transmit beam for the second beam searching.

The UE may identify the second receive beam $w^{wide}_n{'}$ based on the second receive beam parameter $N_r{'}$ and $N_{partial}{'}$, and the BS may identify the second transmit beam $f^{wide}_m{'}$ based on the second transmit beam parameter $N_t{'}$ and $M_{partial}{'}$ received from the UE. After this, the UE may receive an RS from the BS while changing the second receive beam $w^{wide}_n{'}$. The BS may also change the second transmit beam $f^{wide}_m{'}$ when transmitting the RS to the UE.

In an embodiment of the disclosure, in the second beam searching operation, a beam having the largest RSRP value may be identified among the beams used in the first beam searching operation, and additional beam searching may be performed within a certain spatial area from the identified beam.

For example, in operation 510, the UE may identify transmit and receive beams $(f^{wide})^*$ and $(w^{wide})^*$ having the largest RSRP value among the beams used in the first beam searching operation. The UE may transmit information about the identified transmit beam $(f^{wide})^*$ to the BS in operation 520, and the additional second beam searching may be performed in a certain spatial area around the identified transmission and receive beams $(f^{wide})^*$ and $(w^{wide})^*$ in operation 530.

The UE may perform the second beam searching of operation 530 by performing a similar operation to operation 410 shown in FIG. 4. In an embodiment of the disclosure, the UE may select a beam having the largest RSRP value after searching for a narrow beam identified based on the second beam parameter is performed around a spatial area of the transmit and receive beams $(f^{wide})^*$ and $(w^{wide})^*$. In an embodiment of the disclosure, the UE and the BS may perform an additional third beam searching operation by changing the beam parameter.

Figure 6:
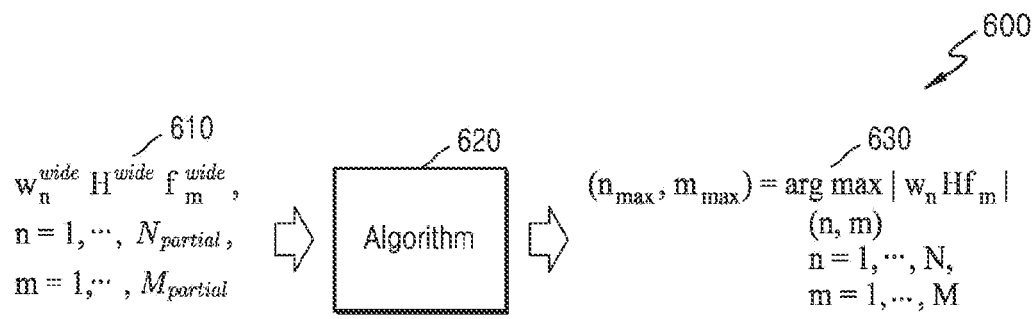
FIG. 6 illustrates an algorithm used for a beam selection operation according to illustrates embodiments of the present disclosure.
Figure 7:
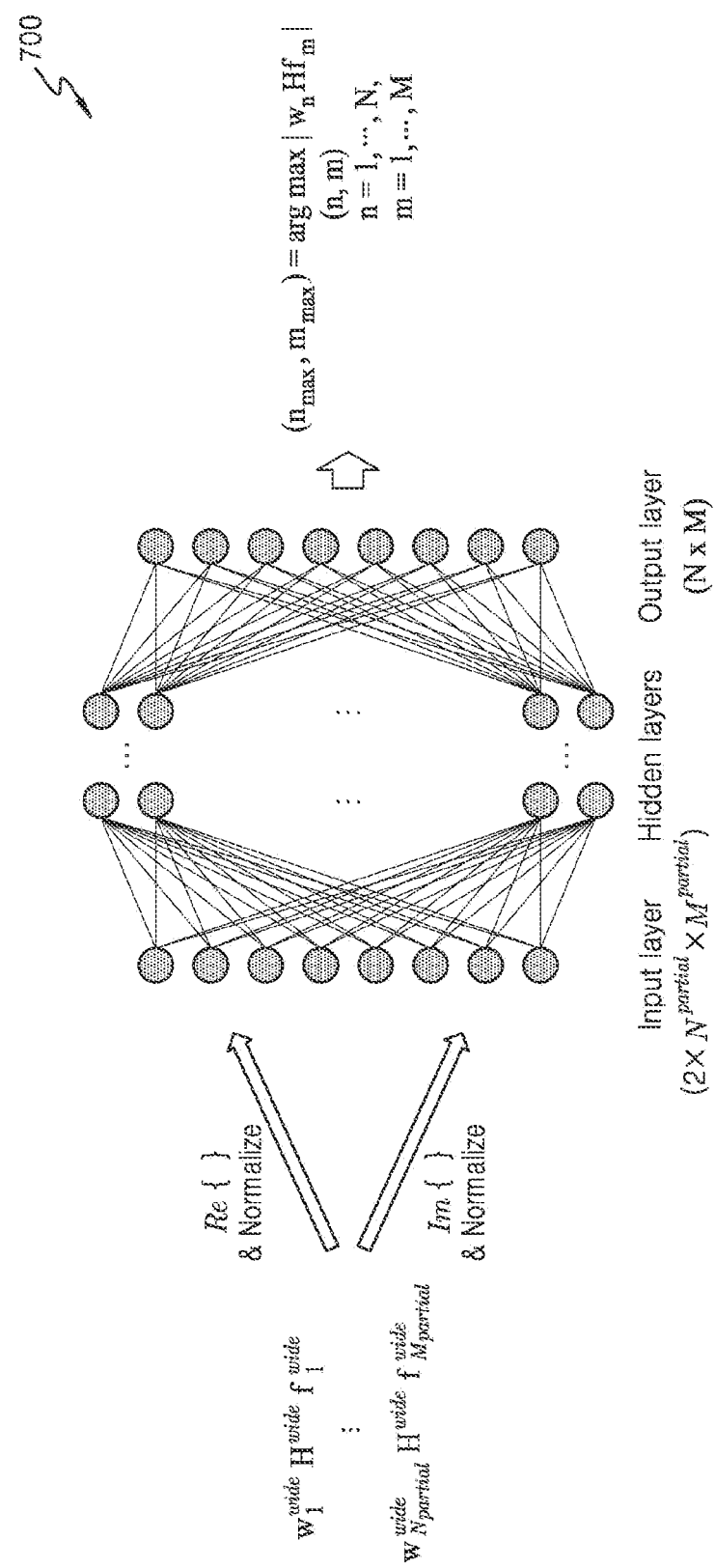
FIG. 7 illustrates an algorithm having a deep neural network (DNN) architecture used in a beam selection operation according to various embodiments of the present disclosure.

FIG. 6 illustrates an algorithm 620 used for a beam selection operation according to various embodiments of the present disclosure, and FIG. 7 illustrates an algorithm 700 having a DNN architecture used in a beam selection operation according to various embodiments of the present disclosure.

When the beam selection mode is determined to be the second mode through operation 420 of FIG. 4 described above, an AI algorithm may be applied to the beams $f^{wide}_k$ and $w^{wide}_l$ identified as having the largest RSRP value among the beams used in the beam searching process of operation 410 to select a transmit beam f* and a receive beam w* to be used for data transmission. When the beam selection mode is determined to be the first mode through operation 420 of FIG. 4 described above, an AI algorithm 620 may be applied to the beams identified as having the largest RSRP value among the second transmission and receive beams used in the second beam searching process 500 of FIG. 5 to select a transmit beam f* and a receive beam w* to be used for data transmission. In an embodiment of the disclosure, the AI algorithm 620 may include an algorithm 700 having a DNN architecture as shown in FIG. 7.

The predefined operation rule or the AI model may be made by learning. The predefined operation rule or the AI model being made by learning refers to the predefined operation rule or the AI model configured to perform a desired feature (or an object) being made when a basic AI model is trained by a learning algorithm with a lot of training data sets. Such training may be performed by the BS or UE itself in which AI is performed according to the disclosure, or by a separate server or system. Examples of the learning algorithm may include supervised learning, unsupervised learning, semi-supervised learning, or reinforcement learning, without being limited thereto.

Referring to FIG. 7, the AI model may include a plurality of neural network layers. Each of the plurality of neural network layers may have a plurality of weight values, and perform neural network operation through operation between an operation result of the previous layer and the plurality of weight values. The plurality of weight values of the plurality of neural network layers may be optimized by learning results of the AI model. For example, the plurality of weight values may be updated to reduce or minimize a loss value or a cost value obtained by the AI model during a training procedure. An artificial neural network may include, for example, a convolutional neural network (CNN), a DNN, a recurrent neural network (RNN), a restricted Boltzmann machine (RBM), a deep belief network (DBN), a bidirectional recurrent deep neural network (BRDNN), or a deep Q-network, without being limited thereto.

Referring to FIGS. 6 and 7, the AI algorithm or DNN algorithm 700 according to an embodiment of the disclosure may have, as an input value 610, a beam identified as having the largest RSRP value among transmit and receive beams used in the first beam searching or second beam searching process. Specifically, the algorithm 620 or DNN algorithm 700 may include, as the input values 610, beams $f^{wide}_k$ (k=1, ..., $N_{partial}$) and $w^{wide}_l$ (l=1, ..., $M_{partial}$) identified as having the largest RSRP value and a channel $H^{wide}$ between the beams. The algorithm 620 or the DNN algorithm 700 may output optimal beam information $n_{max}$ or $m_{max}$ as an output value 630 for data transmission or reception for the input value 610 of $w_n^{wide} H^{wide} f_m^{wide}$, n=1, ..., $N_{partial}$, m=1, ..., $M_{partial}$. The output value 630 of the algorithm 620 or the DNN algorithm 700 may represent information about a beam having maximum effective channel power among all the candidate beams. In an embodiment of the disclosure, the output value 630 of the algorithm 620 or the DNN algorithm 700, ($n_{max}$, $m_{max}$) may be determined by Equation 1 below:

$$(n_{max}, m_{max}) = \underset{\substack{(n,m) \\ n=1,...,N, \\ m=1,...,M}}{\arg\max} |w_n H f_m|. \qquad \text{[Equation 1]}$$

In a beam selection method according to an embodiment of the disclosure, the algorithm 620 or the DNN algorithm 700 may be trained to output beam information approximate to the beam selected when beam searching is performed for all the candidate receive beams available for data communication while using all the antennas available for data communication as the output value 630.

As such, a network entity such as the UE may determine a transmit beam and a receive beam to be used for data transmission through the AI algorithm.

Figure 8:
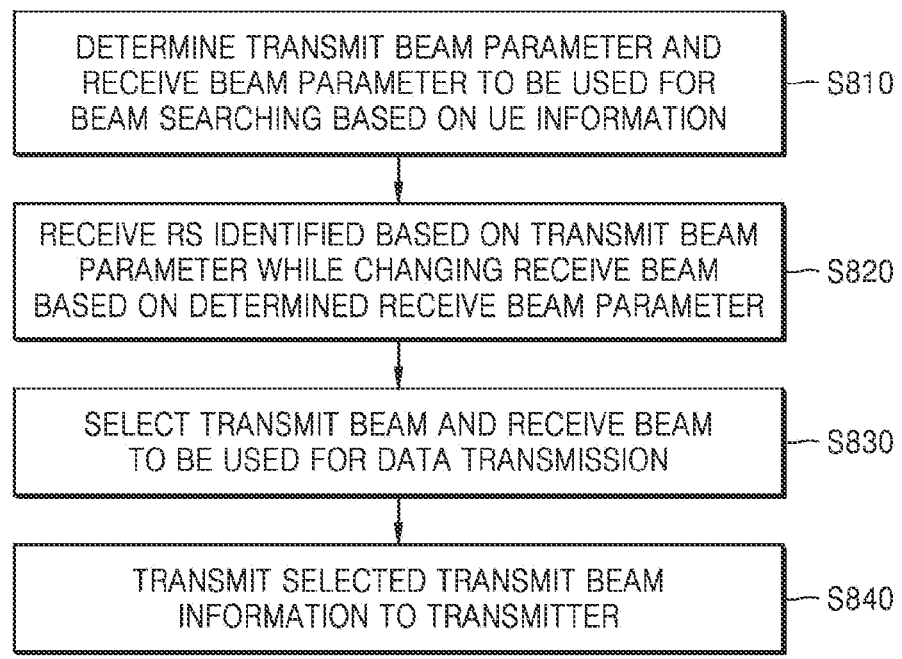
FIG. 8 illustrates a flowchart of a method by which a receiver RX selects a beam in a recovery mode according to various embodiments of the present disclosure.

FIG. 8 illustrates a flowchart of a method 800 by which a receiver RX selects a beam in a recovery mode according to various embodiments of the present disclosure.

In the embodiment of the disclosure in FIG. 8, a beam recovery mode in which a beam recovery operation is performed due to e.g., a change in channel state while the UE is accessing the BS may be considered. In FIG. 8, a link state in which the transmitter TX transmits data to the receiver RX is described. The transmitter TX and the receiver RX may be implemented by various network entities. In an embodiment of the disclosure, when the transmitter TX is the UE and the receiver RX is the BS, the link state may correspond to UL, and when the transmitter TX is the BS and the receiver RX is the UE, the link state may correspond to DL.

In operation S810, the transmitter TX may determine a transmit beam parameter to be used for beam searching based on UE information, and the receiver RX may determine a receive beam parameter to be used for beam searching based on the UE information. The transmit beam parameter and the receive beam parameter may correspond to the transmit beam parameter and the receive beam parameter as described above in connection with FIGS. 2 to 4, respectively. In an embodiment of the disclosure, the beam parameter may be determined based on UE information such as remaining energy of the UE. In an embodiment of the disclosure, the beam parameter may be determined based on e.g., required maximum transmission latency or CQI information.

In operation S820, the receiver RX receives an RS identified based on the transmit beam parameter while changing the receive beam based on the determined receive beam parameter. For example, the receiver RX may define a receive beam based on the determined receive beam parameter, and the transmitter TX may define a transmit beam based on the determined transmit beam parameter. After this, the receiver RX may receive an RS from the transmitter TX while changing the receive beam. The transmitter TX may also change the transmit beam when transmitting the RS to the receiver RX. Operation S820 may correspond to operation S230 of FIG. 2.

In operation S830, the receiver RX may select a transmit beam and a receive beam to be used for data transmission. In an embodiment of the disclosure, the transmit beam and the receive beam to be used for data transmission may be determined based on an RSRP value. Operation S820 may correspond to operation S240 of FIG. 2.

When the RSRP value for any transmit and receive beams is less than a threshold, the receiver RX and the transmitter TX may perform an additional beam searching operation. The width of a transmit beam used for the additional beam searching operation may be smaller than the width of a transmit beam used for the previous beam searching operation, and the width of a receive beam used for the additional beam searching operation may be smaller than the width of a receive beam used for the previous beam searching operation. The additional beam searching operation performed by the receiver RX and the transmitter TX may correspond to the second beam searching operation as described above in connection with FIG. 5.

When the RSRP value for at least one transmit or receive beam is equal to or larger than the threshold, the receiver RX may determine a transmit beam and a receive beam to be used for data transmission through an AI algorithm. The AI algorithm may include, for example, a DNN algorithm. The operation of the receiver RX determining final transmit and receive beams to be used for data transmission through the AI algorithm may correspond to the operation as described above in connection with FIGS. 6 and 7.

In operation S840, the receiver RX transmits information about the selected transmit beam to the transmitter TX. Operation S840 may correspond to operation S250 as described above in connection with FIG. 2.

After this, the receiver RX and the transmitter TX may transmit or receive data with the selected transmit beam and the receive beam. Specifically, the receiver RX may receive data with the selected receive beam, and the transmitter TX may identify the transmit beam based on the transmit beam information received from the receiver RX and transmit data with the identified transmit beam.

Figure 9:
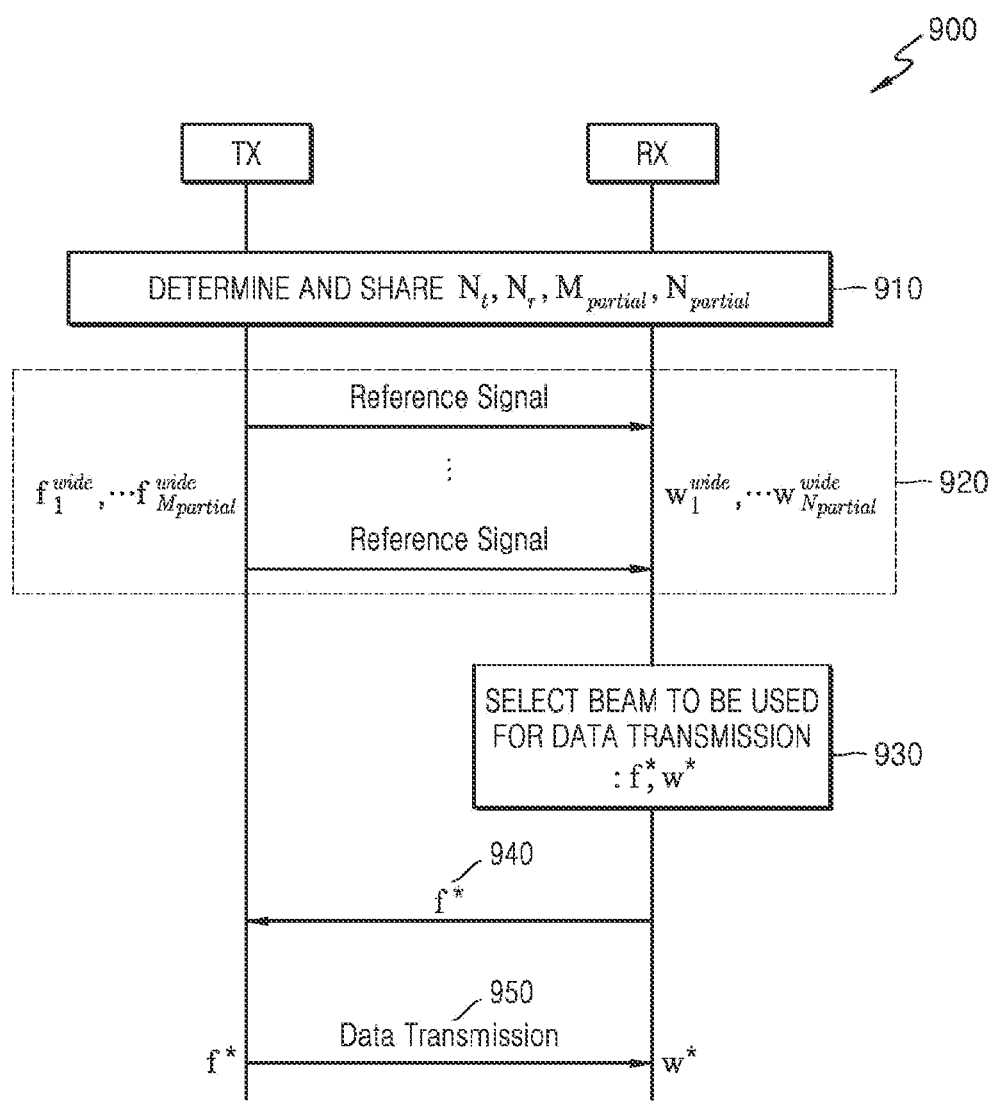
FIG. 9 illustrates operations between a transmitter TX and a receiver RX for performing a method of selecting a beam according to various embodiments of the present disclosure.

FIG. 9 illustrates operations between a transmitter TX and a receiver RX for performing a method 900 of selecting beams f* and w* according to various embodiments of the present disclosure.

Referring to FIG. 9, the receiver RX may receive data from the transmitter TX. The transmitter TX and the receiver RX may be implemented with various network entities. In an embodiment of the disclosure, when the transmitter TX is the UE and the receiver RX is the BS, the link state may correspond to UL, and when the transmitter TX is the BS and the receiver RX is the UE, the link state may correspond to DL.

In operation S910, the receiver RX and the transmitter TX may determine and share beam parameters. For example, when the receiver RX is the UE and the transmitter TX is the BS, the transmitter TX may obtain UE information from the receiver RX. The transmitter TX may determine a transmit beam parameter to be used for beam searching based on the UE information obtained. The receiver RX may determine a receive beam parameter on its own based on the UE information, or receive the receive beam parameter determined by the transmitter TX based on the UE information.

The beam parameters may include the number of antennas used for data transmission and reception or the number of candidate beams available for data transmission and reception. A transmit beam may be identified based on the transmit beam parameter, and a receive beam may be identified based on the receive beam parameter. For example, as the beam parameter, the number of antennas may be related to the beam width and the number of candidate beams may be related to the number of times of beam searching. The beam parameters determined in operation 910 may include the number $N_r$ of receive antennas used for data reception, the number $N_{partial}$ of candidate receive beams available for data reception, the number N. of transmit antennas used for data transmission, or the number $M_{partial}$ of candidate transmit beams available for data transmission.

As the receive beam parameters, the number $N_r$ of receive antennas may be related to the width of the receive beam $w^{wide}_n$, and the number $N_{partial}$ of candidate receive beams may be related to the number of times of beam searching. For example, when a total number of receive antennas available for data communication is $N_R$ and a total number of candidate receive beams available for data communication is N, $N_r$ may be determined to be an integer $N_R \times \alpha$ where $0 < \alpha \leq 1$ and $N_{partial}$ may be determined to be an integer $N \times \beta$ where $0 < \beta \leq 1$.

As the transmit beam parameter, the number $N_t$ of transmit antennas may be related to the width of the transmit beam $f^{wide}_m$, and the number $M_{partial}$ of candidate transmit beams may be related to the number of times of beam searching. For example, when a total number of transmit antennas available for data communication is $N_T$ and a total number of candidate transmit beams available for data communication is M, $N_t$ may be determined to be an integer $N_T \times \gamma$ where $0 < \gamma \leq 1$ and $M_{partial}$ may be determined to be an integer $M \times \delta$ where $0 < \delta \leq 1$.

In operation 920, the receiver RX receives an RS transmitted through the transmit beam $f^{wide}_m$, $m=1, \ldots, M_{partial}$ identified based on transmit beam parameters $N_t$ and $M_{partial}$ while changing the receive beam $w^{wide}_n$, $n=1, \ldots, N_{partial}$ based on the receive beam parameters $N_r$ and $N_{partial}$. Operation 920 may correspond to operation 410 as described above in connection with FIG. 4.

In operation 930, the receiver RX may select a transmit beam f* and a receive beam w* to be used for data transmission based on RSRP and an AI algorithm. Operation 930 may correspond to operations 420 to 430 as described above in connection with FIG. 4.

In operation 940, the receiver RX transmits information about the selected transmit beam f* to the transmitter TX. The receive beam w* is a beam used by the receiver RX to receive data from the transmitter TX, so the information about the receive beam w* may not be transmitted to the transmitter TX. Operation 940 may correspond to operation 440 as described above in connection with FIG. 4.

After this, in step 950 (e.g., operation), the receiver RX and the transmitter TX may transmit or receive data with the selected transmit beam f* and the receive beam w*. Specifically, the receiver RX may receive data with the selected receive beam w*, and the transmitter TX may identify the transmit beam f* based on information about the transmit beam f* received from the receiver RX and transmit data with the identified transmit beam f*. Operation 950 may correspond to operation 450 as described above in connection with FIG. 4.

Figure 10:
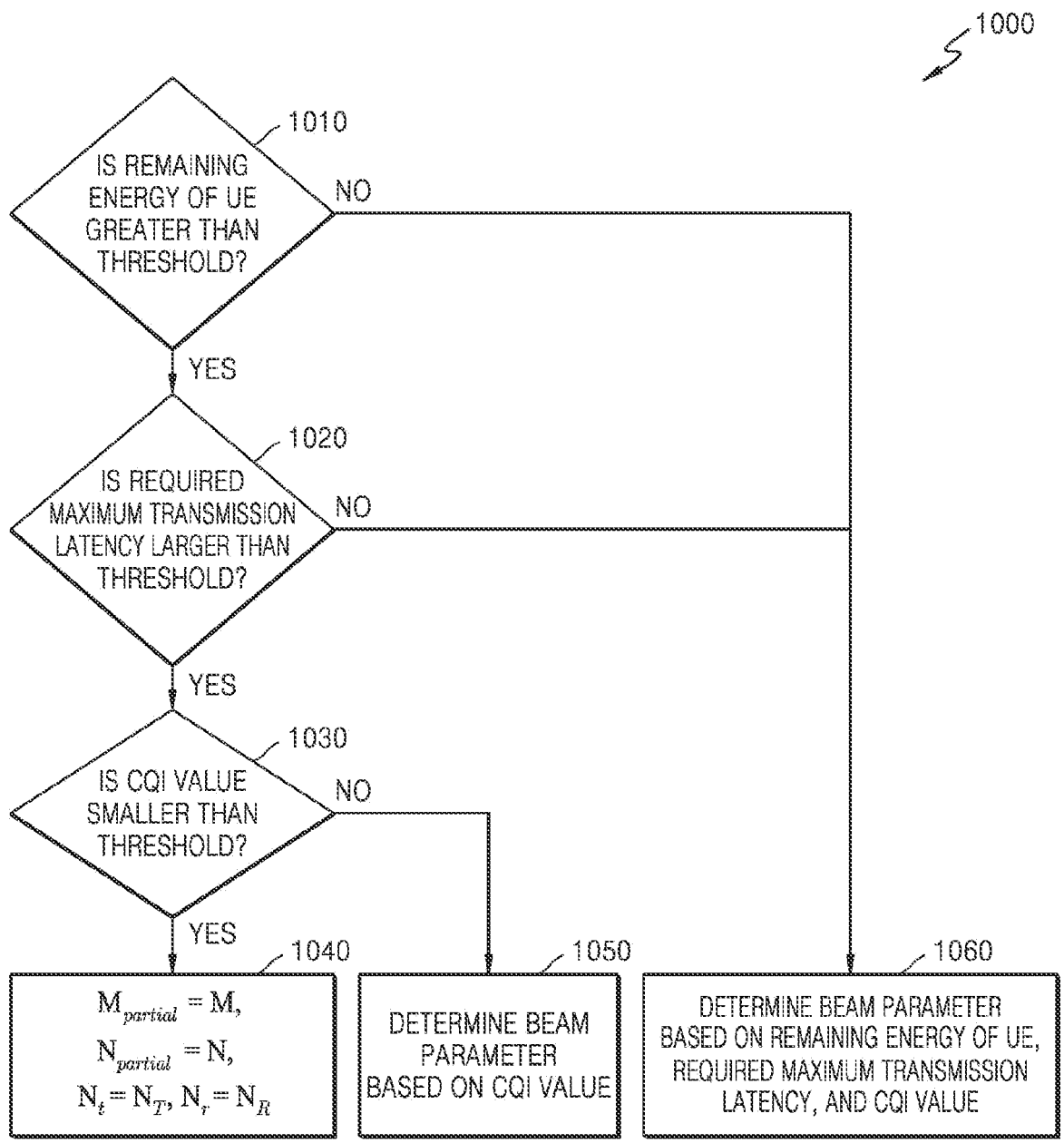
FIG. 10 illustrates an operation of determining a beam parameter to be used for beam searching in a recovery mode according to various embodiments of the present disclosure.

FIG. 10 illustrates an operation 1000 of determining a beam parameter to be used for beam searching in a recovery mode according to various embodiments of the present disclosure.

Referring to FIG. 10, beam parameters to be used for beam searching in the recovery mode according to an embodiment of the disclosure may be determined based on remaining energy of the UE, required maximum transmission latency, and a CQI value. The operation 1000 of determining the beam parameters in FIG. 10 may be performed by a network entity such as the UE, the BS, the transmitter TX, the receiver RX, etc.

In operation 1010, the network entity may determine whether remaining energy of the UE is greater than a threshold. When the remaining energy of the UE is greater than the threshold, it may mean that the UE has energy enough to perform a beam searching operation a certain number of times or more, so the number of candidate beams for data transmission or reception may increase. When the remaining energy of the UE is less than the threshold, the operation 1000 may proceed to operation 1060. In operation 1060, beam parameters may be determined based on remaining energy of the UE, required maximum transmission latency, and a CQI value by considering the number of times of the beam searching operation that may be performed according to the remaining energy of the UE. When the remaining energy of the UE is greater than the threshold, the operation 1000 may proceed to operation 1020.

In operation 1020, the network entity may determine whether the required maximum transmission latency is greater than a threshold. When the required maximum transmission latency is greater than a threshold, it may mean that the beam searching operation requires a certain time or more. Accordingly, the UE may increase the time required for the beam searching operation and increase the number of candidate beams for data transmission or reception. When the required maximum transmission latency for the UE is less than the threshold, the method (e.g., operation 1000) may proceed to operation 1060. In operation 1060, beam parameters may be determined based on the remaining energy of the UE, the required maximum transmission latency, and the CQI value by considering the number of times of the beam searching operation that may be performed according to the required maximum transmission latency for the UE. When the required maximum transmission latency for the UE is greater than the threshold, the operation 1000 may proceed to operation 1030.

In operation 1030, the network entity may determine whether the CQI value is smaller than a threshold. The CQI value may represent feedback information for a DL channel. When the CQI value is smaller than the threshold, the operation 1000 may proceed to operation 1040, and when the CQI value is larger than the threshold, the operation 1000 may proceed to operation 1050.

In operation 1040, the beam parameters may be determined to be $M_{partial}=M$, $N_{partial}=N$, $N_t=N_T$, and $N_r=N_R$ when the remaining energy of the UE and the required maximum transmission latency are each sufficient and the CQI value is small. In the operation of determining the beam parameters as in operation 1040, beam searching may be performed without changing the number of antennas or the number of candidate beams.

In operation 1050, when the remaining energy of the UE and the required maximum transmission latency are each sufficient and the CQI value is big, the beam parameters may be determined based on the CQI value. In the operation of determining the beam parameter based on the CQI value, a lookup table configured in advance may be used. In an embodiment of the disclosure, the lookup table may include information about matching relations between CQI values and beam parameters. For example, a beam parameter corresponding to the CQI value in the lookup table may be determined as a beam parameter for beam searching. The lookup table is a data structure having arrays or associative arrays, which may be used to replace a calculation operation with a simpler array indexing operation. In other words, when the lookup table is used, calculation is not directly performed but whether it matches an existing calculation result value may be determined, thereby further accelerating the processing speed of the processor.

The lookup table may be established before the method of determining a beam according to an embodiment of the disclosure is performed. The lookup table may be set up according to the following operations. The beam selection operation is performed through beam searching for each of various beam parameters, and an achievable rate at a time when data is transmitted or received with the selected beam is calculated. Among beam parameters with an achievable rate of 80% or more when compared to an occasion when a beam having the largest RSRP value is selected by performing beam searching for all the candidate beams using all the antennas for each CQI value, a beam parameter with the smallest number of beam searching times is identified. The identified beam parameter is matched with the CQI value. When there is no beam parameter with rate performance of 80% or more when compared to an occasion when a beam having the largest RSRP value is selected by performing beam searching for all the candidate beams using all the antennas for a certain CQI value, the CQI value is matched with a beam parameter $M_{partial}=M$, $N_{partial}=N$, $N_t=N_T$, $N_r=N_R$. As such, the lookup table may be established by matching beam parameters with all the CQI values.

Turning back to operation 1060, when the remaining energy of the UE or the required maximum transmission latency is not sufficient, beam parameters may be determined based on the remaining energy of the UE, the required maximum transmission latency, and the CQI value by considering the number of times of the beam searching operation that may be performed. Beam parameters may also be determined by using the CQI value in operation 1060, in which case a lookup table established in advance may also be used. The lookup table used in operation 1060 may be established similarly to the operation of establishing the lookup table as described in operation 1050.

The operation of establishing the lookup table used in operation 1060 may further include operations of limiting the number of beam searching times according to the remaining energy of the UE and the required maximum transmission latency and excluding a beam parameter with more than the limited number of beam searching times from the candidate beam parameters. For example, for a certain CQI value, when there is no beam parameter with an achievable rate of a certain percentage, e.g., 80%, or more, when compared to an occasion when a beam having the largest RSRP value is selected by performing beam searching for all the candidate beams using all the antennas, a beam parameter with the highest achievable rate is matched with the CQI value.

Figure 11A:
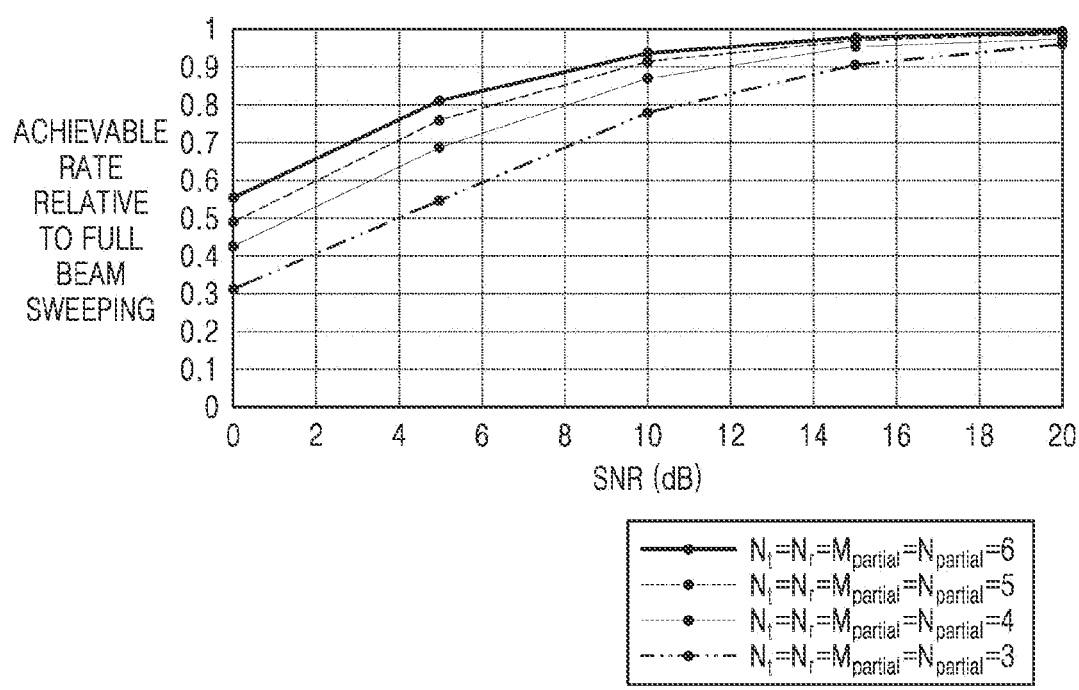
FIG. 11A illustrates an operation of determining a beam parameter to be used for beam searching according to various embodiments of the present disclosure.
Figure 11B:
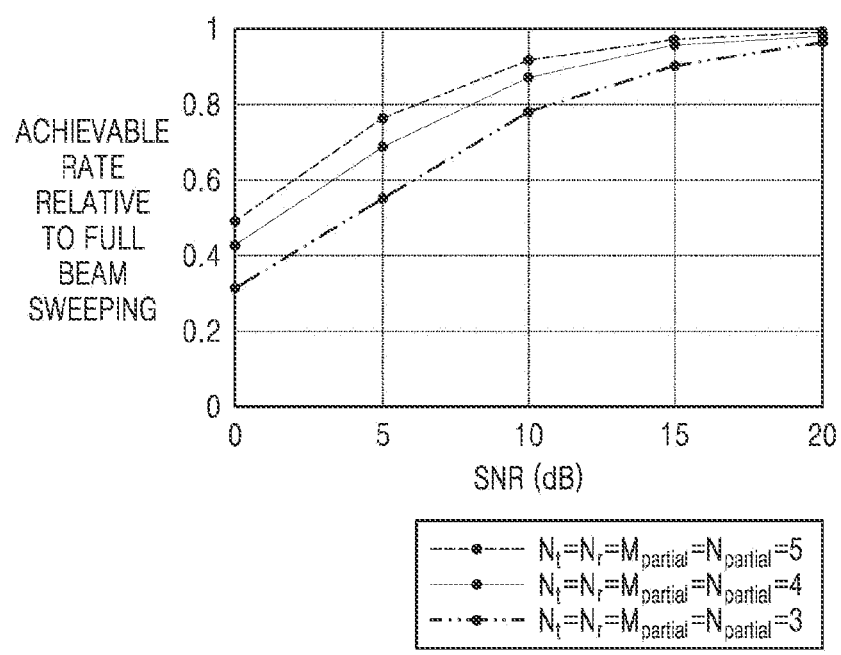
FIG. 11B illustrates an operation of determining a beam parameter to be used for beam searching according to various embodiments of the present disclosure.

FIGS. 11A and 11B illustrate operations of determining beam parameters to be used for beam searching according to various embodiments of the present disclosure. Specifically, FIG. 11A illustrates a method of establishing a lookup table to be used for operation of determining a beam parameter based on a CQI value in operation 1050 of FIG. 10, and FIG. 11B illustrates an example method of establishing a lookup table to be used for operation of determining a beam parameter based on a CQI value in operation 1060 of FIG. 10.

In an embodiment of the disclosure, a total number of transmit antennas used for data transmission $N_T$ may be 8, a total number of receive antennas $N_R$ may be 8, a total number of candidate transmit beams available for data transmission M may be 8, and a total number of candidate receive beams N may be 8. When a beam parameter is ($N_t$, $N_r$, $M_{partial}$, $N_{partial}$), a reference beam parameter ($N_T$, $N_R$, M, N) may be (8, 8, 8, 8), i.e., ($N_T$, $N_R$, M, N)=(8, 8, 8, 8). In this case, the lookup table to be used for an operation of determining a beam parameter may be established by the following operations.

First, it is assumed for convenience of explanation that there are four candidate beam parameters as follows:

(3, 3, 3, 3): $N_t$=$N_r$=$M_{partial}$=$N_{partial}$=3 (the number of beam searching times: $M_{partial}$×$N_{partial}$=9);

(4, 4, 4, 4): $N_t$=$N_r$=$M_{partial}$=$N_{partial}$=4 (the number of beam searching times: $M_{partial}$×$N_{partial}$=16);

(5, 5, 5, 5): $N_t$=$N_r$=$M_{partial}$=$N_{partial}$=5 (the number of beam searching times: $M_{partial}$×$N_{partial}$=25); and (6, 6, 6, 6): $N_t$=$N_r$=$M_{partial}$=$N_{partial}$=6 (the number of beam searching times: $M_{partial}$×$N_{partial}$=36).

The beam parameter according to an embodiment of the disclosure is not limited to those four, but may be composed in any combination of various values of $N_t$, $N_r$, $M_{partial}$, and $N_{partial}$ satisfying $N_{partial}$<N, $M_{partial}$<M, $N_r$<$N_R$, and $N_t$<$N_T$. For example, for a certain parameter ($N_t$, $N_r$, $M_{partial}$, $N_{partial}$), some of the values of $N_t$, $N_r$, $M_{partial}$, and $N_{partial}$ may be the same or the values of $N_t$, $N_r$, $M_{partial}$, and $N_{partial}$ may all be different.

Beam searching is performed with a beam corresponding to each candidate beam parameter, and a beam may then be selected for data transmission or reception. An operation of selecting a beam for data transmission or reception may correspond to operation S240 of FIG. 2, operation 430 of FIG. 4, operation S830 of FIG. 8, and operation 930 of FIG. 9.

Subsequently, an achievable rate at a time when data is transmitted or received with the selected beam is calculated, and compared with an achievable rate at a time when data is transmitted or received with a reference beam selected after beam searching is performed based on the reference beam parameter ($N_T$, $N_R$, M, N).

FIG. 11A illustrates an achievable rate in a case of using each candidate beam parameter in relation to a case of using the reference beam parameter. For each CQI value, a beam parameter with the smallest number of beam searching times may be identified among beam parameters with an achievable rate of 80% or more as compared to the case of using the reference beam parameter (an achievable rate relative to full beam sweeping=0.8 or more). Table 1 below represents the associated results.

TABLE 1

| CQI | SNR (dB) | beam parameter ($N_t$, $N_r$, $M_{partial}$, $N_{partial}$) |
|---|---|---|
| 0~7 | less than 5 dB | (8, 8, 8, 8) |
| — | equal to or more than 5 dB and less than 6 dB | (6, 6, 6, 6) |
| 8.9 | equal to or more than 6 dB and less than 8 dB | (5, 5, 5, 5) |
| 10, 11, 12 | equal to or more than 8 dB and less than 11 dB | (4, 4, 4, 4) |
| 13, 14, 15 | equal to or more than 11 dB | (3, 3, 3, 3) |

Subsequently, a lookup table may be established by matching the identified beam parameter with a corresponding CQI value until all CQI values are matched with beam parameters.

For example, for the embodiment of the disclosure as shown in FIG. 11A and Table 1, a lookup table like Table 2 below may be established.

TABLE 2

| CQI | ($N_t$, $N_r$, $M_{partial}$, $N_{partial}$) |
|---|---|
| 0 | (8, 8, 8, 8) |
| 1 | (8, 8, 8, 8) |
| 2 | (8, 8, 8, 8) |
| 3 | (8, 8, 8, 8) |
| 4 | (8, 8, 8, 8) |
| 5 | (8, 8, 8, 8) |
| 6 | (8, 8, 8, 8) |
| 7 | (8, 8, 8, 8) |
| 8 | (5, 5, 5, 5) |
| 9 | (5, 5, 5, 5) |
| 10 | (4, 4, 4, 4) |
| 11 | (4, 4, 4, 4) |
| 12 | (4, 4, 4, 4) |
| 13 | (3, 3, 3, 3) |
| 14 | (3, 3, 3, 3) |
| 15 | (3, 3, 3, 3) |

In an embodiment of the disclosure, the lookup table set up in advance in the aforementioned method may be used for determining a beam parameter for beam searching based on a CQI value. For example, a beam parameter corresponding to the CQI value in the lookup table may be determined as a beam parameter for beam searching.

FIG. 11B illustrates an operation of establishing a lookup table in an embodiment where the number of beam searching times is limited according to remaining energy of the UE and required maximum transmission latency. For example, an occasion when the maximum number of beam searching times according to the remaining energy of the UE and the required maximum transmission latency is 30 may be assumed. In this case, a beam parameter with which the limited number of beam searching times according to the remaining energy of the UE and the required maximum transmission latency is exceeded may be excluded from candidate beam parameters. For example, among candidate beam parameters (3, 3, 3, 3), (4, 4, 4, 4), (5, 5, 5, 5), and (6, 6, 6, 6), the beam parameter (6, 6, 6, 6) with the number of beam searching times exceeding 30 may be excluded from the candidate beam parameters. Accordingly, the following three candidate beam parameters may be singled out:

(3, 3, 3, 3): $N_t=N_r=M_{partial}=N_{partial}=3$ (the number of beam searching times: $M_{partial} \times N_{partial}=9$);

(4, 4, 4, 4): $N_t=N_r=M_{partial}=N_{partial}=4$ (the number of beam searching times: $M_{partial} \times N_{partial}=16$); and (5, 5, 5, 5): $N_t=N_r=M_{partial}=N_{partial}=5$ (the number of beam searching times: $M_{partial} \times N_{partial}=25$).

FIG. 11B illustrates an achievable rate in a case of using each candidate beam parameter in relation to a case of using the reference beam parameter. For each CQI value, a beam parameter with the smallest number of beam searching times may be identified among beam parameters with an achievable rate of 80% or more as compared to the case of using the reference beam parameter (an achievable rate relative to full beam sweeping=0.8 or more). For a certain CQI value, when there is no beam parameter with the achievable rate of 80% or more in relation to the case of using the reference beam parameter, a beam parameter having the highest achievable rate may be identified. Table 3 below represents the associated results.

TABLE 3

| CQI | SNR (dB) | beam parameter ($N_t$, $N_r$, $M_{partial}$, $N_{partial}$) |
|---|---|---|
| 0–9 | less than 8 dB | (5, 5, 5, 5) |
| 10, 11, 12 | equal to or more than 8 dB and less than 11 dB | (4, 4, 4, 4) |
| 13, 14, 15 | equal to or more than 11 dB | (3, 3, 3, 3) |

Subsequently, a lookup table may be established by matching the identified beam parameter with a corresponding CQI value until all CQI values are matched with beam parameters.

For example, for the embodiment of the disclosure as shown in FIG. 11B and Table 3, a lookup table like Table 4 below may be established.

TABLE 4

| CQI | ($N_t$, $N_r$, $M_{partial}$, $N_{partial}$) |
|---|---|
| 0 | (5, 5, 5, 5) |
| 1 | (5, 5, 5, 5) |
| 2 | (5, 5, 5, 5) |
| 3 | (5, 5, 5, 5) |
| 4 | (5, 5, 5, 5) |
| 5 | (5, 5, 5, 5) |
| 6 | (5, 5, 5, 5) |
| 7 | (5, 5, 5, 5) |
| 8 | (5, 5, 5, 5) |
| 9 | (5, 5, 5, 5) |
| 10 | (4, 4, 4, 4) |
| 11 | (4, 4, 4, 4) |
| 12 | (4, 4, 4, 4) |
| 13 | (3, 3, 3, 3) |
| 14 | (3, 3, 3, 3) |
| 15 | (3, 3, 3, 3) |

In an embodiment of the disclosure, the lookup table set up in advance in the aforementioned method may be used for determining a beam parameter for beam searching based on a CQI value. For example, a beam parameter corresponding to the CQI value in the lookup table may be determined as a beam parameter for beam searching.

Figure 12A:
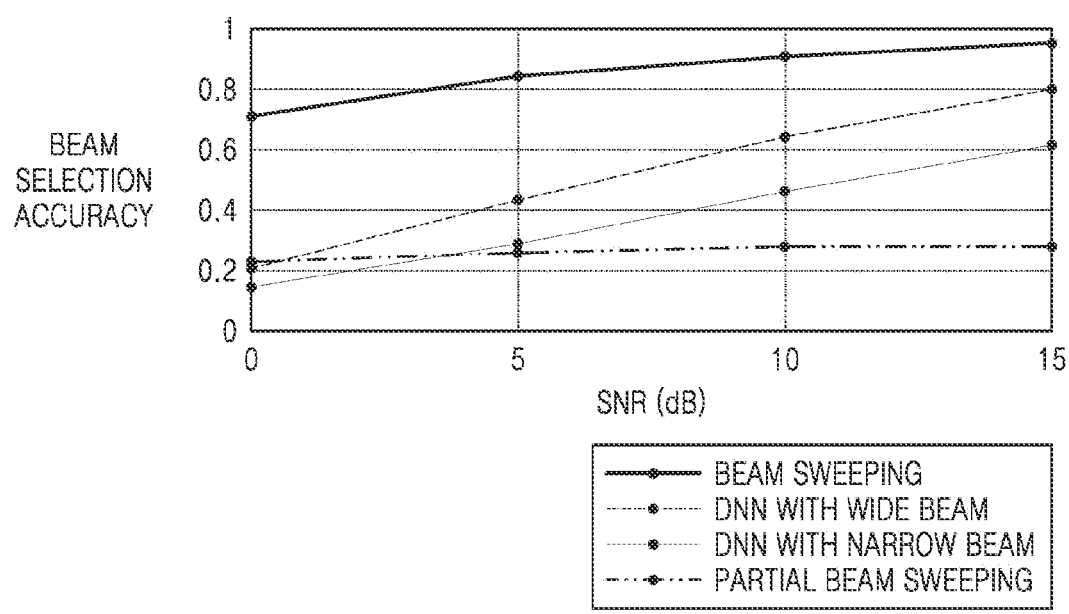
FIG. 12A illustrates a graph for describing accuracy in beam selection when an algorithm having a DNN architecture is used for a beam selection operation according to various embodiments of the present disclosure.
Figure 12B:
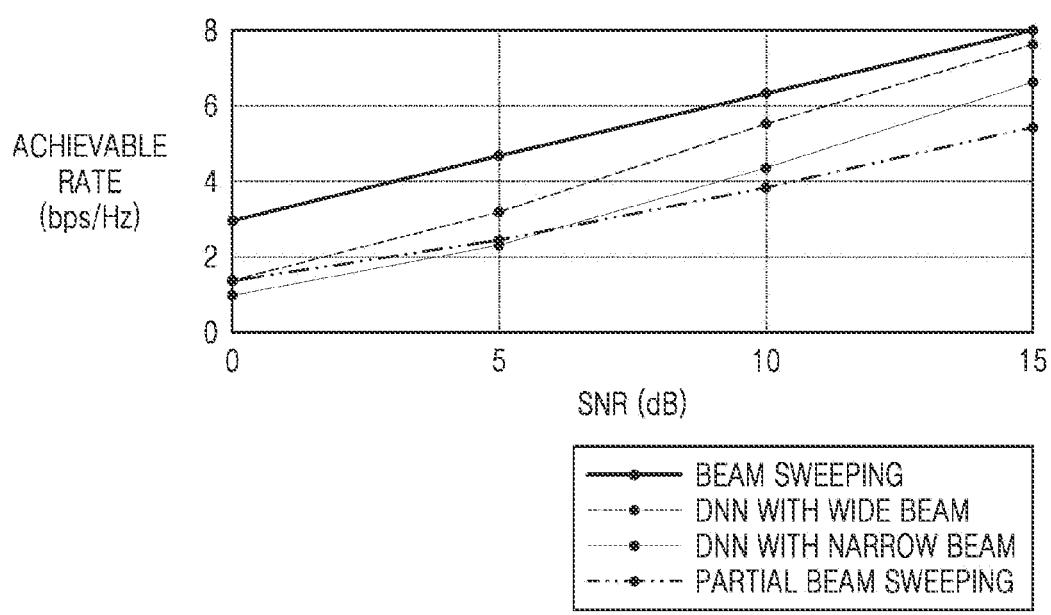
FIG. 12B illustrates a graph for describing a data transfer rate when data transmission or reception is performed by using a beam selected based on an algorithm having a DNN architecture according to various embodiments of the present disclosure.

FIG. 12A illustrates a graph for describing accuracy in beam selection when a DNN algorithm is used for a beam selection operation according to various embodiments of the present disclosure, and FIG. 12B is a graph for describing a data transfer rate when data transmission or reception is performed with a beam selected based on a DNN algorithm, according to an embodiment of the disclosure.

In the experimental examples shown in FIGS. 12A and 12B, a uniform linear array (ULA) channel model including three routes (L=3) was assumed and the ULA routes and their gains were set to $g_1 \sim CN(0, 1)$, $g_2 \sim CN(0, 0.01)$, and $g_3 \sim CN(0, 0.01)$. Channel H may be expressed as in Equation 2 below:

$$H = \sqrt{\frac{N_R N_T}{L}} \sum_{i=1}^{L} g_i u(N_R, \theta(i)) u^H(N_T, \varphi(i)) \quad \text{[Equation 2]}$$

where $g_i$ is zero-mean complex Gaussian distribution, $\theta(i) \in [-\pi, \pi]$, $\varphi(i) \in [-\pi, \pi]$, $$u(N, \theta) = \frac{1}{\sqrt{N}}\left[1, \exp\left(j(1)\frac{2\pi}{\lambda}d\sin(\theta)\right), \ldots, \exp\left(j(N-1)\frac{2\pi}{\lambda}d\sin(\theta)\right)\right]^T,$$

$\lambda$ is a wavelength, and d is a distance between neighboring antennas, which is $\lambda/2$.

Transmit and receive beams used in the experimental example were generated based on a density-functional theory (DFT) based codebook. An analog precoder $f_m$ and an analog combiner $w_n$ generated based on the DFT based codebook may be expressed in Equation 3 below:

[Equation 3]

$$f_m = \sqrt{\frac{1}{N_t}}\left[1, \exp\left(-j2\pi(1)\frac{m-1}{M}\right), \ldots, \exp\left(-j2\pi(N_t-1)\frac{m-1}{M}\right)\right]^T,$$
$$m = 1, \ldots, M$$

$$w_n = \sqrt{\frac{1}{N_r}}\left[1, \exp\left(-j2\pi(1)\frac{n-1}{N}\right), \ldots, \exp\left(-j2\pi(N_r-1)\frac{n-1}{N}\right)\right],$$
$$n = 1, \ldots, N.$$

The number of transmit antennas used for data transmission $N_T$ was set to 8, the number of receive antennas $N_R$ was set to 8, the number of candidate transmit beams available for data transmission M was set to 8, and the number of candidate receive beams N was set to 8. Furthermore, searching was performed for 25% of the entire beams by setting the number of transmit antennas used for the beam searching operation $N_t$ to 4, the number of candidate transmit beams with which beam searching is performed $M_{partial}$ to 4 and the number of candidate receive beams $N_{partial}$ to 4.

In the experimental example, a DNN algorithm used for the final beam selection for data transmission or reception was configured to have such characteristics as shown in Table 5 below.

TABLE 5

| Input | $w_n^{wide} H^{wide} f_m^{wide}$, n = 1, $\cdots$, $N_{partial}$, m = 1, $\cdots$, $M_{partial}$ |
|---|---|

TABLE 5-continued

| | |
|---|---|
| Output | $(n_{max}, m_{max\square}) = \arg\max\limits_{(n,m)} |w_n Hf_m|$ <br> $n=1,\ldots,N,$ <br> $m=1,\ldots,M$ |
| Layers | # of hidden layers: 1 <br> Number of nodes: 256 |
| Optimizer | Adam optimizer |
| Learning rate | $0.01 \times \alpha$ |
| Number of training set & Test set | 1000000/10000 |
| Batch size & Epoch | 1000/100 |

Referring to FIGS. 12A and 12B, when the final beam to be used for data transmission or reception is selected by adjusting the number of antennas and using a DNN algorithm in the beam searching operation according to an embodiment of the disclosure, it may have performance approximate to that of a method of selecting a beam through a beam searching operation with the entire antennas. In FIGS. 12A and 12B, a "beam sweeping" plot represents an occasion when beam searching is performed for all the candidate beams with all the antennas, and a "partial beam sweeping" plot represents an occasion when beam searching is performed for some of the candidate beams yet with all the antennas. A "DNN with narrow beam" plot represents an occasion when the final beam is selected by applying the DNN algorithm to beam searching results for partial beams that use all the antennas, and a "DNN with wide beam" plot represents an occasion when the final beam is selected by applying the DNN algorithm to beam searching results with beams that become wide with a reduction in the number of antennas. In FIGS. 12A and 12B, it may be seen that a method of performing beam searching with wide beams and selecting a final beam for data transmission or reception according to an embodiment of the disclosure in a high SNR area may attain performance approximate to an occasion of beam searching for all the candidate beams using all the antennas (beam sweeping).

In a beam selection method according to an embodiment of the disclosure, network entities such as the BS or the UE may perform hierarchical beam searching to select an optimal beam for data transmission or reception while reducing overall overhead of the system. The beam selection method according to an embodiment of the disclosure has an effect of reducing system overhead caused by beam searching by reducing the number of beam searching times. Furthermore, with the use of the DNN algorithm, higher performance than the case of simply reducing the number of beam searching times may be attained, thereby reducing system overhead and reducing deterioration of overall communication performance.

Figure 13:
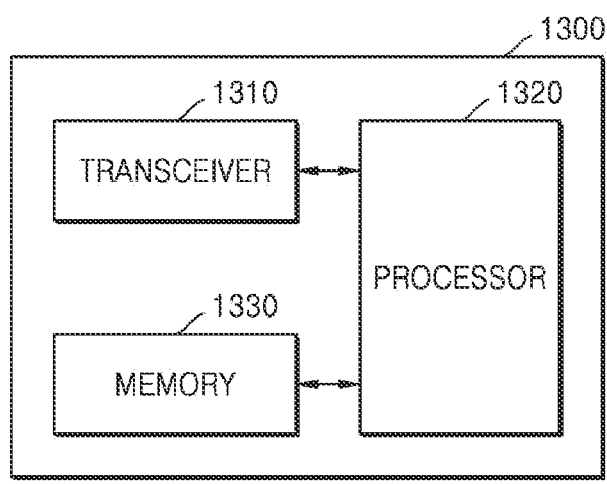
FIG. 13 illustrates a schematic block diagram of a BS according to various embodiments of the present disclosure.

FIG. 13 illustrates a schematic block diagram of a BS 1300 according to various embodiments of the present disclosure.

Referring to FIG. 13, the BS 1300 may include a transceiver 1310, a processor 1320, and a memory 1330. The transceiver 1310, the processor 1320 and the memory 1330 of the BS 1300 may operate according to the aforementioned communication method of the BS 1300. Elements of the BS 1300 are not, however, limited thereto. For example, the base station 1300 may include more or fewer elements than described above. In addition, the transceiver 1310, the processor 1320, and the memory 1330 may be implemented in a single chip. The processor 1320 may include one or more processors.

A receiver and a transmitter of the BS 1300 are collectively called the transceiver 1310, which may transmit or receive signals to or from a UE or a network entity. The signals to be transmitted to or received from the UE or the network entity may include control information and data. For this, the transceiver 1310 may include an RF transmitter for up-converting the frequency of a signal to be transmitted and amplifying the signal and an RF receiver for low-noise amplifying a received signal and down-converting the frequency of the received signal. It is merely an example of the transceiver 1310, and the elements of the transceiver 1310 are not limited to the RF transmitter and RF receiver.

The transceiver 1310 may perform functions for transmitting and receiving signals on a wireless channel. For example, the transceiver 1310 may receive a signal on a wireless channel and output the signal to the processor 1320, and transmit a signal output from the processor 1320 on a wireless channel.

The memory 1330 may store a program and data required for operation of the base station 1300. Furthermore, the memory 1330 may store control information or data included in a signal obtained by the BS. The memory 1330 may include a storage medium such as a read only memory (ROM), a random access memory (RAM), a hard disk, a compact disc ROM (CD-ROM), and a digital versatile disk (DVD), or a combination of storage mediums. Alternatively, the memory 1330 may not be separately present but integrated into the processor 1320. The memory 1330 may include a volatile memory, a non-volatile memory, or a combination of the volatile memory and the non-volatile memory. The memory 1330 may also provide the stored data at the request of the processor 1320.

The processor 1320 may control a series of processes for the BS 1300 to be operated according to the embodiments of the disclosure. For example, the processor 1320 may receive control signals and data signals through the transceiver 1310 and process the received control signals and data signals. The processor 1320 may transmit the processed control signal and data signal through the transceiver 1310. The processor 1320 may record data to the memory 1330 or read out data from the memory 1330. The processor 1320 may perform functions of a protocol stack requested by a communication standard. For this, the processor 1320 may include at least one processor or microprocessor. In an embodiment of the disclosure, part of the transceiver 1310 and the processor 1320 may be referred to as a communication processor (CP).

The processor 1320 may include one or more processors. The one or more processors may include a universal processor such as a central processing unit (CPU), an application processor (AP), a digital signal processor (DSP), etc., a dedicated graphic processor such as a graphics processing unit (GPU), a vision processing unit (VPU), etc., or a dedicated AI processor such as a neural processing unit (NPU). For example, when the one or more processors are the dedicated AI processors, they may be designed in a hardware structure that is specific to dealing with a particular AI model.

In an embodiment of the disclosure, the processor 1320 may determine a first transmit beam parameter including information about the number of transmit antennas to be used for first beam searching, transmit the determined first transmit beam parameter to the UE through the transceiver 1310, change a transmit beam based on the first transmit beam parameter, transmit first RS to the UE, receive, from the UE through the transceiver 1310, information about a transmit beam to be used for data transmission or reception, and select a beam for data transmission or reception with the UE based on the received information about the transmit beam.

Figure 14:
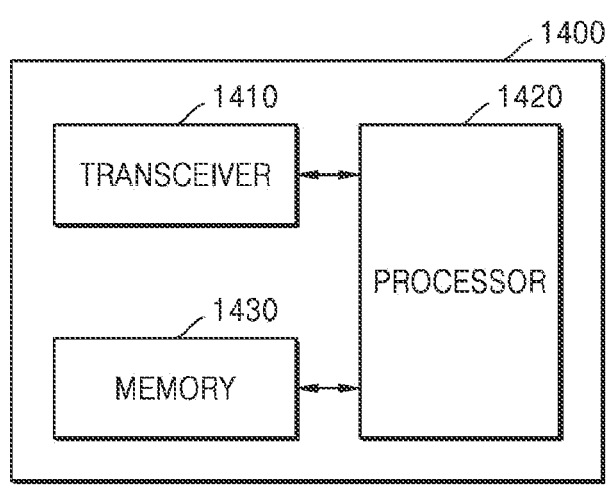
FIG. 14 illustrates a schematic block diagram of a UE according to various embodiments of the present disclosure.

FIG. 14 illustrates a schematic block diagram of a UE 1400, according to various embodiments of the present disclosure.

Referring to FIG. 14, the UE 1400 may include a transceiver 1410, a processor 1420, and a memory 1430. Elements of the UE 1400 are not, however, limited thereto. For example, the UE 1400 may include more or fewer elements than described above. In an embodiment of the disclosure, the transceiver 1410, the processor 1420, and the memory 1430 may be implemented in a single chip.

The processor 1420 may include one or more processors. The one or more processors may include a universal processor such as a CPU, an AP, a DSP, etc., a GPU, a VPU, etc., or a dedicated AI processor such as an NPU. For example, when the one or more processors are the dedicated AI processors, they may be designed in a hardware structure that is specific to dealing with a particular AI model.

The processor 1420 may control a series of processes for the UE 1400 to be operated according to the aforementioned embodiments of the disclosure. For example, the processor 1420 may receive control signals and data signals through the transceiver 1410 and process the received control signals and data signals. The processor 1420 may transmit the processed control signal and data signal through the transceiver 1410. Furthermore, the processor 1420 may control input data derived from the received control signal and data signal to be processed according to a predefined operation rule or artificial intelligence (AI) model stored in the memory 1430. The processor 1420 may record data to the memory 1430 or read out data from the memory 1430. The processor 1420 may further perform functions of a protocol stack requested by a communication standard. In an embodiment of the disclosure, the processor 1420 may include at least one processor. In an embodiment of the disclosure, part of the transceiver 1410 or the processor 1420 may be referred to as a CP.

In an embodiment of the disclosure, the processor 1420 may determine a first receive beam parameter including information about the number of receive antennas to be used for first beam searching, receive, from the BS through the transceiver 1410, a first transmit beam parameter including information about the number of transmit antennas to be used for the first beam searching, receive first RS identified based on the first transmit beam parameter while changing a receive beam based on the first receive beam parameter, select a transmit beam and a receive beam to be used for data transmission and reception based on the received first RS, and transmit information about the transmit beam to the BS through the transceiver 1410.

The memory 1430 may store a program and data required for operation of the UE 1400. Furthermore, the memory 1430 may store control information or data included in a signal obtained by the UE 1400. Furthermore, the memory 1430 may store predefined operation rules or an AI model used by the UE 1400. The memory 1430 may include a storage medium such as a ROM, a RAM, a hard disk, a CD-ROM, and a DVD, or a combination of storage mediums. Alternatively, the memory 1430 may not be separately present but integrated into the processor 1420. The memory 1430 may include a volatile memory, a non-volatile memory, or a combination of the volatile memory and the non-volatile memory. The memory 1430 may also provide the stored data at the request of the processor 1420.

The transceiver 1410 may refer to a transmitter and a receiver, and the transceiver 1410 of the UE 1400 may transmit or receive signals to or from a BS or a network entity. The signals may include control information and data. For this, the transceiver 1410 may include an RF transmitter for up-converting the frequency of a signal to be transmitted and amplifying the signal and an RF receiver for low-noise amplifying a received signal and down-converting the frequency of the received signal. It is merely an example of the transceiver 1410, and the elements of the transceiver 1410 are not limited to the RF transmitter and RF receiver. In addition, the transceiver 1410 may receive a signal on a wireless channel and output the signal to the processor 1420, and transmit a signal output from the processor 1420 on a wireless channel.

Embodiments of the disclosure may be implemented in the form of a computer-readable recording medium that includes computer-executable instructions such as the program modules executed by the computer. The computer-readable medium may be an arbitrary available medium that may be accessed by the computer, including volatile, non-volatile, removable, and non-removable mediums. The computer-readable medium may also include a computer storage medium. The computer-readable medium includes all the volatile, non-volatile, removable, and non-removable mediums implemented by an arbitrary method or technology for storage of information, such as computer-readable instructions, data structures, program modules, or other data.

Embodiments of the disclosure may be implemented with a software program including instructions stored in a computer-readable storage medium.

The computer is a device capable of calling out instructions stored in a storage medium and operating under the instructions as in the embodiments of the disclosure, and may include an electronic device according to the embodiments of the disclosure.

The computer-readable storage medium may be provided in the form of a non-transitory storage medium. The term 'non-transitory' only means that the storage medium is tangible without including a signal but does not help distinguish any data stored semi-permanently or temporarily in the storage medium.

Furthermore, the control methods according to embodiments of the disclosure may be included and provided in a computer program product. The computer program product may be a commercial product that may be traded between a seller and a buyer.

The computer program product may include a software program and a computer-readable storage medium having the software program stored thereon. For example, the computer program product may include a product in the form of a software program that is electronically distributed by the manufacturer of the device or by an electronic market (e.g., Google Play Store®, or App Store®). For the electronic distribution, at least a portion of the software program may be stored in a storage medium or arbitrarily created. In this case, the storage medium may be one of a server of the manufacturer or of a relay server that temporarily stores the software program.

In a system including a server and a device, the computer program product may include a storage medium of the server or a storage medium of the device. Alternatively, when there is a third device (e.g., a smart phone) communicatively connected to the server or the device, the computer program product may include a storage medium of the third device. In another example, the computer program product may be transferred from the server to the device or the third party, or may include a software program itself that is transferred from the third device to the device.

In this case, one of the server, the device, and the third device may execute the computer program product to perform the method according to the embodiments of the disclosure. Alternatively, two or more of the server, the device, and the third device may execute the computer program product to perform the method according to the embodiments of the disclosure in a distributed fashion.

For example, the server (e.g., a cloud server or an AI server) may execute the computer program product stored therein to control the device communicatively connected to the server to perform the method according to the embodiments of the disclosure.

In yet another example, the third device may execute the computer program product to control the device communicatively connected to the third device to perform the method according to the embodiments of the disclosure. In the case that the third device executes the computer program product, the third device may download the computer program product and execute the downloaded computer program product. Alternatively, the third device may execute the computer program product that is preloaded to perform the method according to the embodiments of the disclosure.

In the specification, the term "module" may refer to a hardware component such as a processor or a circuit, and/or a software component executed by the hardware component such as the processor.

Several embodiments have been described, but a person of ordinary skill in the art will understand and appreciate that various modifications can be made without departing the scope of the disclosure. Thus, it will be apparent to those of ordinary skill in the art that the disclosure is not limited to the embodiments described, but can encompass not only the appended claims but the equivalents. For example, an element described in the singular form may be implemented as being distributed, and elements described in a distributed form may be implemented as being combined.

The scope of the disclosure is defined by the appended claims, and it will be understood by those of ordinary skill in the art that various changes in form and details may be made without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) for selecting a beam in an initial access mode of a wireless communication system, the method comprising:
    determining a first receive beam parameter including information for a number of receive antennas activated for first beam searching;
    receiving, from a base station (BS), a first transmit beam parameter including information for a number of transmit antennas activated for the first beam searching;
    receiving a first reference signal (RS) based on the first transmit beam parameter while changing receive beams based on the first receive beam parameter;
    selecting, based on the received first RS, a transmit beam and a receive beam for data communication;
    determining, based on reference signal receive power (RSRP) of the received first RS, the selecting operation of the transmit beam and the receive beam for the data communication as:
        a first mode in which additional beam searching is performed; or
        a second mode in which additional beam searching is not performed; and
    transmitting, to the BS, information for the selected transmit beam,
    wherein the selecting operation of the transmit beam and the receive beam determined as the first mode comprises:
        determining a second receive beam parameter including information for a number of receive antennas activated for second beam searching;
        receiving, from the BS, a second transmit beam parameter including information for a number of transmit antennas activated for the second beam searching;
        receiving, based on the second transmit beam parameter, a second RS identified while changing receive beams based on the second receive beam parameter; and
        selecting, based on the received second RS, the transmit beam and the receive beam for the data communication.

2. The method of claim 1, wherein the number of receive antennas activated for the second beam searching is larger than the number of receive antennas activated for the first beam searching, and
    wherein the number of transmit antennas activated for the second beam searching is larger than the number of transmit antennas activated for the first beam searching.

3. The method of claim 1, wherein the selecting operation of the transmit beam and the receive beam determined as the second mode comprises:
    identifying a transmit beam and a receive beam including a larger RSRP value of the received first RS than other transmit beams and receive beams; and
    selecting the transmit beam and the receive beam for the data communication based on the identified transmit beam and receive beam and a preconfigured artificial intelligence (AI) algorithm.

4. The method of claim 1, wherein the first receive beam parameter further comprises information for a number of candidate receive beams for the first beam searching, and
    wherein the first transmit beam parameter further comprises information for a number of candidate transmit beams for the first beam searching.

5. A method of a base station (BS) for selecting a beam in an initial access mode of a wireless communication system, the method comprising:
    determining a first transmit beam parameter including information for a number of transmit antennas activated for first beam searching;
    transmitting, to a user equipment (UE), the determined first transmit beam parameter;
    transmitting, to the UE, a first reference signal (RS) based on the first transmit beam parameter, while changing transmit beams;
    receiving, from the UE, information for a transmit beam for data communication; and
    selecting a beam for the data communication based on the received information for the transmit beam; and
    when receiving a signal to perform additional beam searching from the UE:

determining a second transmit beam parameter including information for a number of transmit antennas activated for second beam searching;

transmitting the determined second transmit beam parameter to the UE; and transmitting, to the UE, a second reference signal (RS) while changing transmit beams based on the second transmit beam parameter.

6. The method of claim 5, wherein the number of transmit antennas activated for the second beam searching is larger than the number of transmit antennas activated for the first beam searching.

7. The method of claim 5, wherein the first transmit beam parameter further comprises information for a number of candidate transmit beams for the first beam searching.

8. A method of a receiver for selecting a beam in a beam recovery mode of a wireless communication system, the method comprising:

identifying a first receive beam parameter including information for a number of receive antennas activated for first beam searching and a first transmit beam parameter including information for a number of transmit antennas activated for the first beam searching;

receiving a first reference signal (RS) based on the first transmit beam parameter while changing receive beams based on the first receive beam parameter;

selecting, based on the received first RS, a transmit beam and a receive beam for data communication;

determining, based on reference signal received power (RSRP) of the received first RS, the selecting operation of the transmit beam and the receive beam for the data communication as:

a first mode in which additional beam searching is performed; or a second mode in which additional beam searching is not performed; and transmitting, to a transmitter, information for the selected transmit beam, wherein the selecting operation of the transmit beam and the receive beam determined as the first mode comprises:

identifying a second receive beam parameter including information for a number of receive antennas activated for second beam searching and a second transmit beam parameter including information for a number of transmit antennas activated for the second beam searching;

receiving a second RS based on the second transmit beam parameter while changing receive beams based on the second receive beam parameter; and selecting, based on the received second RS, a transmit beam and a receive beam for data communication.

9. The method of claim 8, wherein identifying the first receive beam parameter and the first transmit beam parameter comprises:

identifying user equipment (UE) information including remaining energy or required maximum transmission latency; and determining, based on the identified UE information, the first receive beam parameter and the first transmit beam parameter.

10. The method of claim 8, wherein identifying the first receive beam parameter and the first transmit beam parameter comprises:

identifying channel state information including a channel quality indicator (CQI); and determining, based on the identified channel state information, the first receive beam parameter and the first transmit beam parameter.

11. The method of claim 8, wherein the number of receive antennas activated for the second beam searching is larger than the number of receive antennas activated for the first beam searching, and wherein the number of transmit antennas activated for the second beam searching is larger than the number of transmit antennas activated for the first beam searching.

12. The method of claim 8, wherein the selecting operation of the transmit beam and the receive beam determined as the second mode comprises:

identifying a transmit beam and a receive beam including a larger RSRP value of the received first RS than other transmit beams and receives beams; and selecting the transmit beam and the receive beam for the data communication based on the identified transmit beam and receive beam and a preconfigured artificial intelligence (AI) algorithm.

13. The method of claim 8, wherein the first receive beam parameter further comprises information for a number of candidate receive beams for the first beam searching, and wherein the first transmit beam parameter further comprises information for a number of candidate transmit beams for the first beam searching.

* * * * *